(12) United States Patent
Arai

(10) Patent No.: US 7,835,089 B2
(45) Date of Patent: Nov. 16, 2010

(54) ZOOM LENS, OPTICAL APPARATUS HAVING THE SAME, AND MANUFACTURING METHOD

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/576,525

(22) Filed: Oct. 9, 2009

(65) Prior Publication Data

US 2010/0091382 A1 Apr. 15, 2010

(30) Foreign Application Priority Data

Oct. 9, 2008 (JP) ............................. 2008-262452
Oct. 9, 2008 (JP) ............................. 2008-262453

(51) Int. Cl.
*G02B 15/14* (2006.01)

(52) U.S. Cl. ...................... 359/783; 359/684; 359/685; 359/740; 359/726; 359/764

(58) Field of Classification Search ......... 359/683–685, 359/740, 726, 763, 764
See application file for complete search history.

(56) References Cited

U.S. PATENT DOCUMENTS

| | | | |
|---|---|---|---|
| 6,754,446 B2 * | 6/2004 | Hagimori et al. ............ | 359/764 |
| 7,116,489 B2 * | 10/2006 | Ohtake ........................ | 359/687 |
| 7,173,768 B2 | 2/2007 | Kushida et al. | |
| 7,593,168 B2 * | 9/2009 | Shirota ........................ | 359/684 |
| 7,630,138 B2 * | 12/2009 | Ori ............................. | 359/676 |
| 7,688,519 B2 * | 3/2010 | Ito ............................. | 359/683 |
| 2007/0002443 A1 * | 1/2007 | Toyama ...................... | 359/557 |
| 2008/0094726 A1 | 4/2008 | Heu | |
| 2008/0198474 A1 * | 8/2008 | Morooka et al. ............ | 359/684 |
| 2009/0002840 A1 * | 1/2009 | Shirota ........................ | 359/683 |

FOREIGN PATENT DOCUMENTS

JP 2006-301543 A 11/2006
JP 2007-148056 A 6/2007

\* cited by examiner

*Primary Examiner*—Evelyn A. Lester
(74) *Attorney, Agent, or Firm*—Miles & Stockbridge P.C.

(57) ABSTRACT

A zoom lens having an optical element for deflecting an optical path includes, in order from an object: a first lens group having positive refractive power; a second lens group having negative refractive power; a third lens group having positive refractive power; a fourth lens group having positive refractive power; and a fifth lens group having negative refractive power. The third lens group has a plurality of lenses, and the following conditional expressions $1.00 < PL/fW < 1.75$ and $0.30 < PL/fT < 0.45$ are satisfied, where PL denotes an optical path length of the optical element for deflecting the optical path, fW denotes a focal length of the zoom lens in a wide angle end state, and fT denotes a focal length of the zoom lens in a telephoto end state.

26 Claims, 19 Drawing Sheets

(EXAMPLE 1)

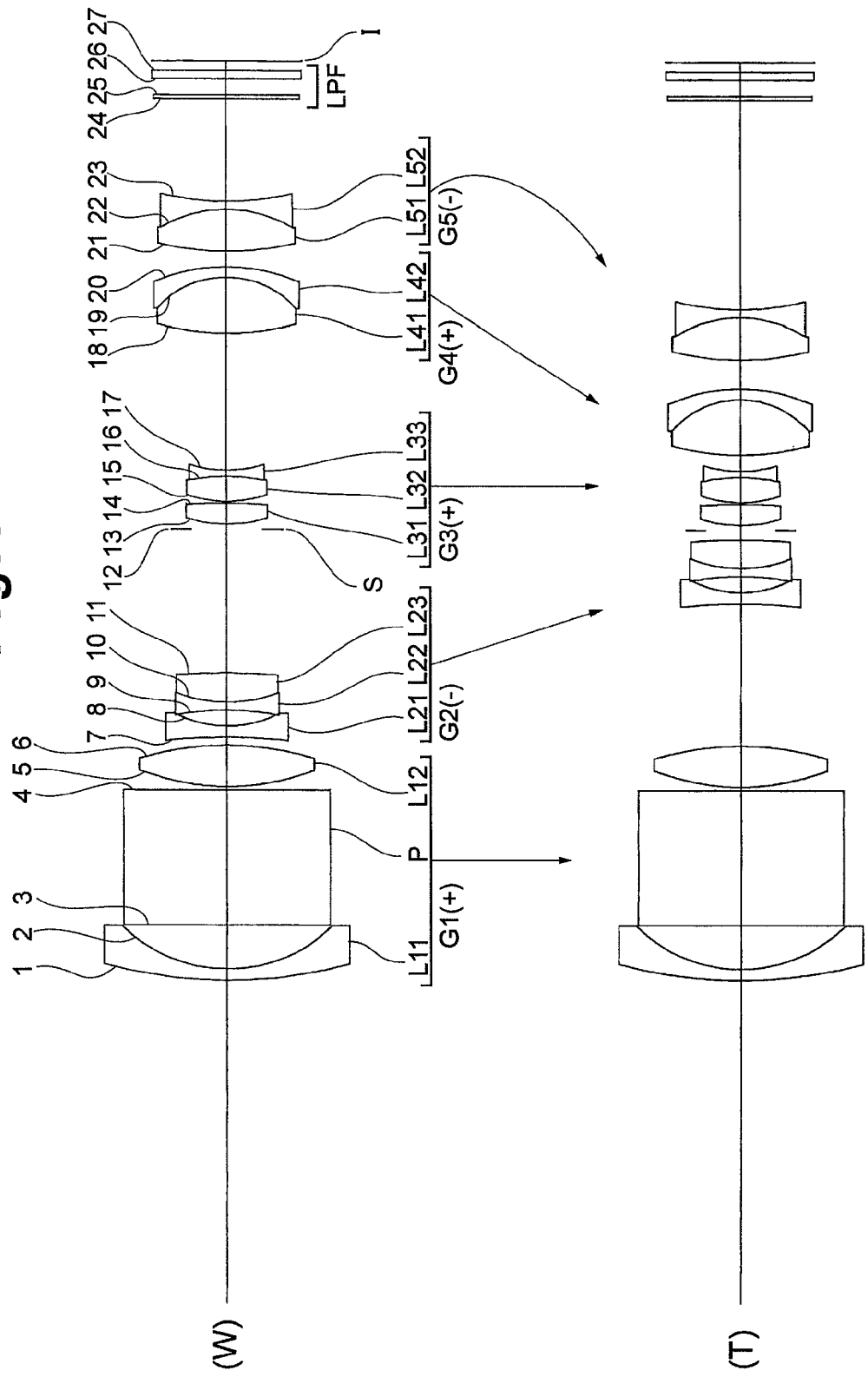

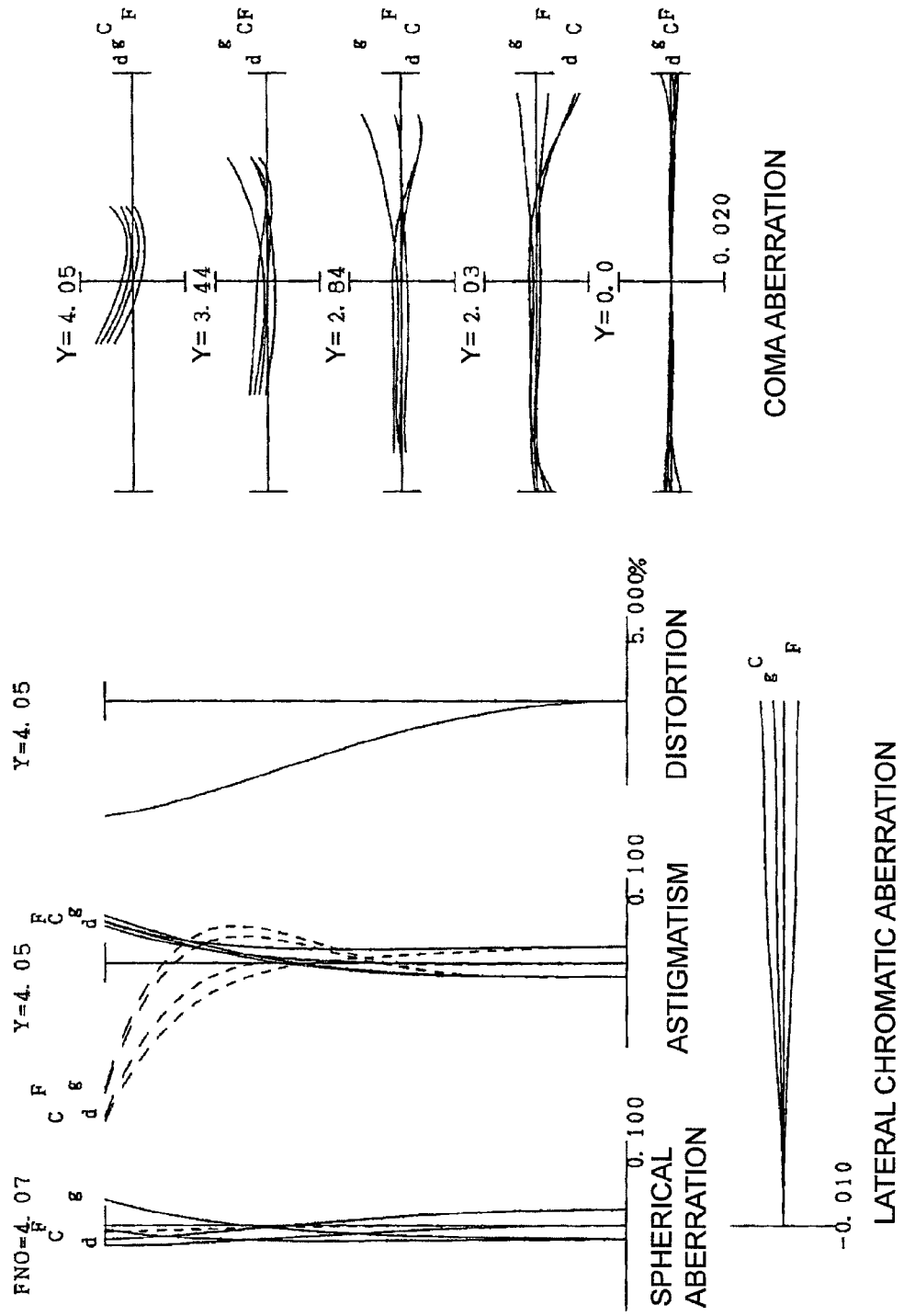

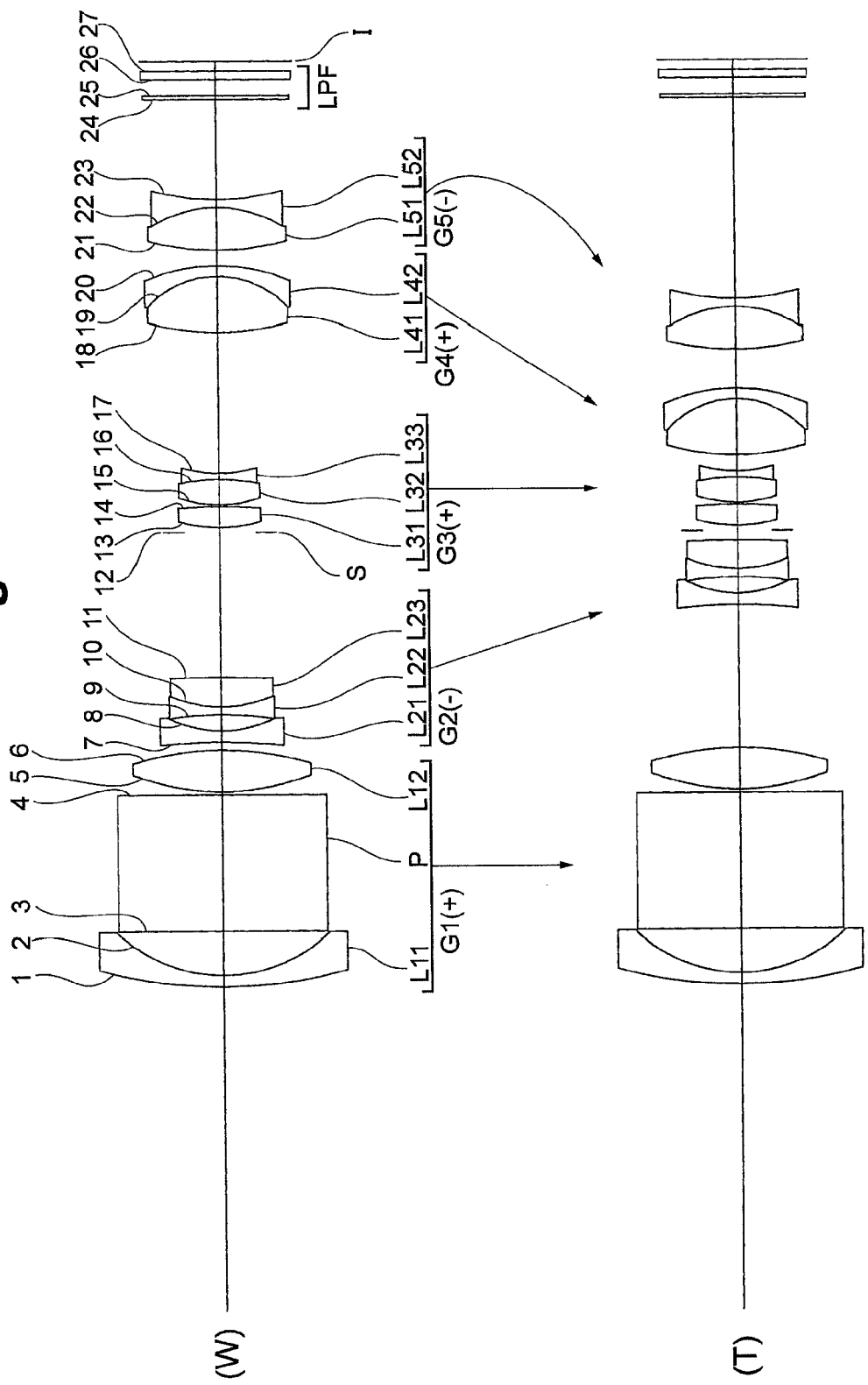
Fig.3 (EXAMPLE 2)

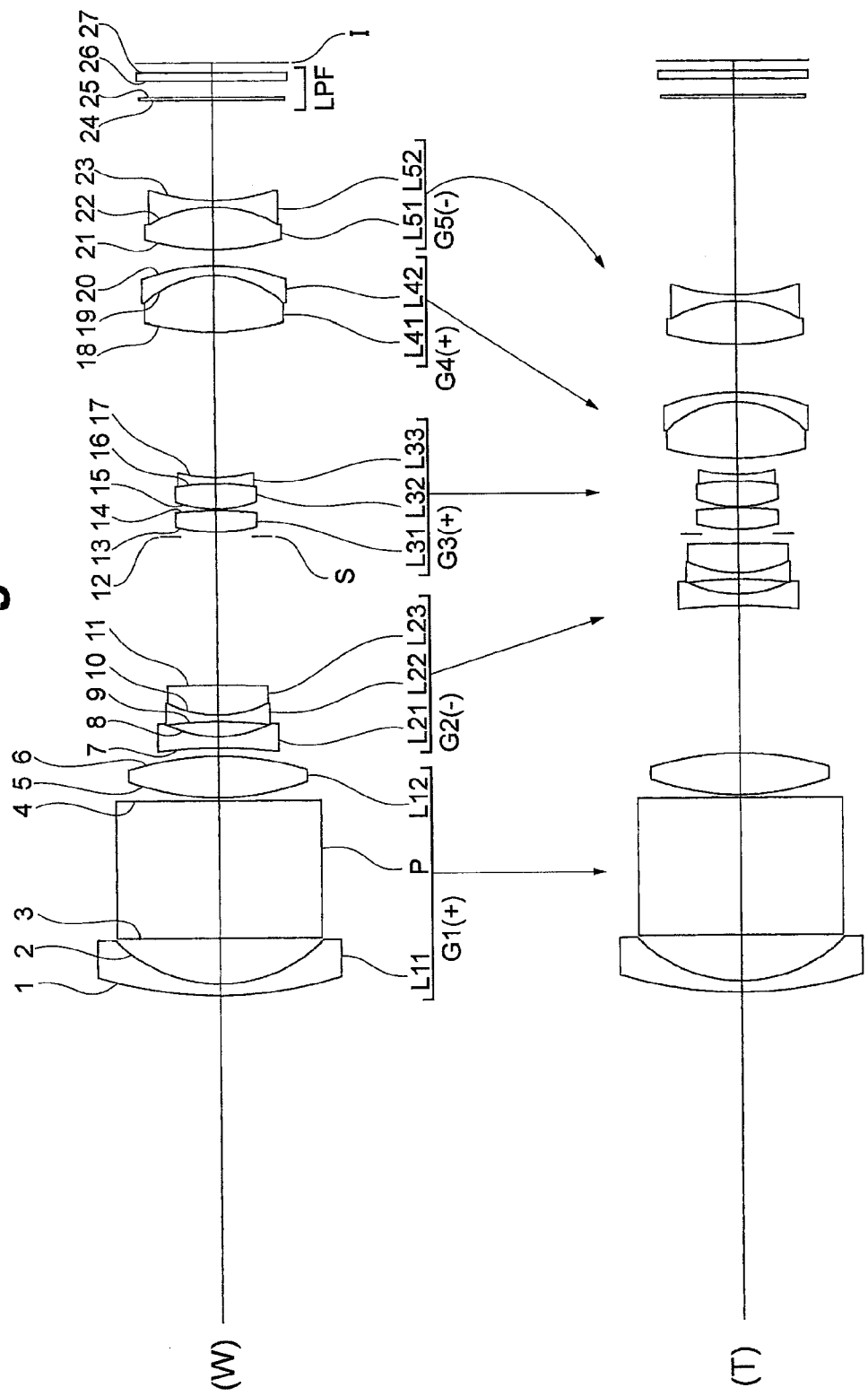

ZOOM LENS, OPTICAL APPARATUS HAVING THE SAME, AND MANUFACTURING METHOD

INCORPORATION BY REFERENCE

This invention claims the benefit of Japanese Patent Applications No. 2008-262452 and No. 2008-262453 which are hereby incorporated by reference.

FIELD OF THE INVENTION

The present invention relates to a zoom lens, optical apparatus having the same and manufacturing method.

BACKGROUND OF THE INVENTION

Recently importance has been placed on the portability of digital still cameras, and zoom lenses, which are imaging lenses, have been decreasing in size and weight, so that the main body of the camera can be smaller, thinner and lighter. For example, a five-group type zoom lens comprising a first lens group having positive refractive power, a second lens group having negative refractive power, a third lens group having positive refractive power, a fourth lens group having positive refractive power and a fifth lens group having negative refractive power, where an optical element (prism) which deflects the optical path by approximately 90° is disposed in the first lens group, has been proposed (e.g. see Japanese Patent Application Laid-Open No. 2007-148056). This configuration, whereby the lens does not protrude from the camera body when the lens shifts from the stored state to the operation sate, can greatly contribute to decreasing the size and thickness of a camera.

PROBLEMS TO BE SOLVED BY THE INVENTION

In the case of a conventional zoom lens, however, the air space between each lens group is effectively changed upon zooming from the wide angle end state to the telephone end state, so as to contribute to downsizing, but it is difficult to make the zoom ratio ×4 or more.

SUMMARY OF THE INVENTION

With the foregoing in view, it is an object of the present invention to provide an ultracompact high image quality and high zoom ratio zoom lens which is suitable for a video camera and electronic still camera using a solid image sensing element, having an optical element to deflect the optical path, an optical apparatus having this lens, and a manufacturing method thereof.

MEANS TO SOLVE THE PROBLEMS

To achieve this object, a first aspect of the present invention is a zoom lens having an optical element for deflecting an optical path, comprising, in order from an object: a first lens group having positive refractive power; a second lens group having negative refractive power; a third lens group having positive refractive power; a fourth lens group having positive refractive power; and a fifth lens group having negative refractive power, wherein the third lens group has a plurality of lenses, and the following conditional expressions $1.00<PL/fW<1.75$ and $0.30<PL/fT<0.45$ are satisfied, where PL denotes an optical path length of the optical element for deflecting the optical path, fW denotes a focal length of the zoom lens in a wide angle end state, and fT denotes a focal length of the zoom lens in a telephoto end state.

In the first aspect of the present invention, it is preferable that the second lens group, the fourth lens group and the fifth lens group are moved upon zooming from the wide angle end state to the telephoto end state.

In the first aspect of the present invention, it is preferable that the aperture stop is disposed between the second lens group and the third lens group.

In the first aspect of the present invention, it is preferable that the first lens group and the third lens group are fixed in positions on an optical axis upon zooming from the wide angle end state to the telephoto end state.

In the first aspect of the present invention, it is preferable that the following conditional expression $1.0<fG3/fG4<2.0$ is satisfied, where fG3 is a focal length of the third lens group and fG4 denotes a focal length of the fourth lens group.

In the first aspect of the present invention, it is preferable that the first lens group has, in order from the object, a lens having negative refractive power, an optical element for deflecting the optical path, and a lens having positive refractive power.

In the first aspect of the present invention, it is preferable that the third lens group has, in order from the object, a lens having positive refractive power, and a cemented lens of a lens having positive refractive power and a lens having negative refractive power.

In the first aspect of the present invention, it is preferable that at least one of the fourth lens group and the fifth lens group is one cemented lens.

In the first aspect of the present invention, it is preferable that at least one of the fourth lens group and the fifth lens group has a cemented lens of a lens having positive refractive power and a lens having negative refractive power.

An optical apparatus of the present invention (e.g. digital still camera CAM according to the present embodiment) has the zoom lens according to the first aspect of the present invention.

A second aspect of the present invention is a zoom lens having an optical element for deflecting an optical path, comprising, in order from an object: a first lens group having positive refractive power; a second lens group having negative refractive power; a third lens group having positive refractive power; a fourth lens group having positive refractive power; and a fifth lens group having negative refractive power, wherein the third lens group has, in order from the object, a lens having positive refractive power, and a cemented lens of a lens having positive refractive power and a lens having negative refractive power, and the following conditional expressions $1.5<PL/fW<3.0$ and $0.0<PL/PWL<0.17$ are satisfied, where PL denotes an optical path length of the optical element, fW is a focal length of the zoom lens in a wide angle end state, and PWL is an optical axis length of the optical element from an entrance plane to an imaging plane.

In the second aspect of the present invention, it is preferable that the second lens group, the fourth lens group and the fifth lens group are moved upon zooming from the wide angle end state to the telephoto end state.

In the second aspect of the present invention, it is preferable that the aperture stop is disposed between the second lens group and the third lens group.

In the second aspect of the present invention, it is preferable that the first lens group and the third lens group are fixed in positions on an optical axis upon zooming from the wide angle end state to the telephoto end state.

In the second aspect of the present invention, it is preferable that the following conditional expression 1.0<fG3/fG4<2.0 is satisfied, where fG3 is a focal length of the third lens group and fG4 denotes a focal length of the fourth lens group.

In the second aspect of the present invention, it is preferable that the first lens group has, in order from the object, a lens having negative refractive power, an optical element for deflecting the optical path, and a lens having positive refractive power.

In the second aspect of the present invention, it is preferable that at least one of the fourth lens group and the fifth lens group is one cemented lens.

In the second aspect of the present invention, it is preferable that at least one of the fourth lens group and the fifth lens group has a cemented lens of a lens having positive refractive power and a lens having negative refractive power.

Also, an optical apparatus of the present invention (e.g. digital still camera 1 according to the present embodiment) has the zoom lens according to the second aspect of the present invention.

A manufacturing method according to the first aspect of the present invention is a manufacturing method for a zoom lens having an optical element for deflecting an optical path, the method including disposing, in order from an object, a first lens group having positive refractive power, a second lens group having negative refractive power, a third lens group having positive refractive power, a fourth lens group having positive refractive power, and a fifth lens group having negative refractive power, wherein the third lens group has a plurality of lenses, and the following conditional expressions 1.00<PL/fW<1.75 and 0.30<PL/fT<0.45 are satisfied, where PL denotes an optical path length of the optical element for deflecting the optical path, fW denotes a focal length of the zoom lens in a wide angle end state, and fT denotes a focal length of the zoom lens in a telephoto end state.

A manufacturing method according to the second aspect of the present invention is a manufacturing method for a zoom lens having an optical element for deflecting an optical path, the method including disposing, in order from an object, a first lens group having positive refractive power, a second lens group having negative refractive power, a third lens group having positive refractive power, a fourth lens group having positive refractive power, and a fifth lens group having negative refractive power, wherein the third lens group has, in order from the object, a lens having positive refractive power, and a cemented lens of a lens having positive refractive power and a lens having negative refractive power, and the following conditional expressions 1.5<PL/fW<3 and 0.0<PL/PWL<0.17 are satisfied, where PL denotes an optical path length of the optical element, fW is a focal length of the zoom lens in a wide angle end state, and PWL is an optical axis length of the optical element from an entrance plane to an imaging plane.

ADVANTAGEOUS EFFECTS OF THE INVENTION

According to the present invention, an ultracompact high image quality and high zoom ratio zoom lens, which is suitable for a video camera and electronic still camera using a solid image sensing element, and has an optical element to deflect the optical path, an optical apparatus having this lens, and a manufacturing method thereof, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a cross-sectional view depicting a configuration of a zoom lens according to Example 1, where (W) shows a state of focusing on infinity in the wide angle end state, and (T) shows a state of focusing on infinity in the telephoto end state;

FIG. 2A to FIG. 2C are graphs showing various aberrations of the zoom lens according to Example 1, where FIG. 2A are graphs showing various aberrations upon focusing on infinity in the wide angle end state, FIG. 2B are graphs showing various aberrations upon focusing on infinity in the intermediate focal length state, and FIG. 2C are graphs showing various aberrations upon focusing on infinity in the telephoto end state;

FIG. 3 is a cross-sectional view depicting a configuration of a zoom lens according to Example 2, where (W) shows a state of focusing on infinity in the wide angle end state, and (T) shows a state of focusing on infinity in the telephoto end state;

FIG. 7 is a cross-sectional view depicting a configuration of a zoom lens according to Example 4, where (W) shows a state of focusing on infinity in the wide angle end state, and (T) shows a state of focusing on infinity in the telephoto end state;

DESCRIPTION OF THE PREFERRED EMBODIMENTS

Figure 2B:
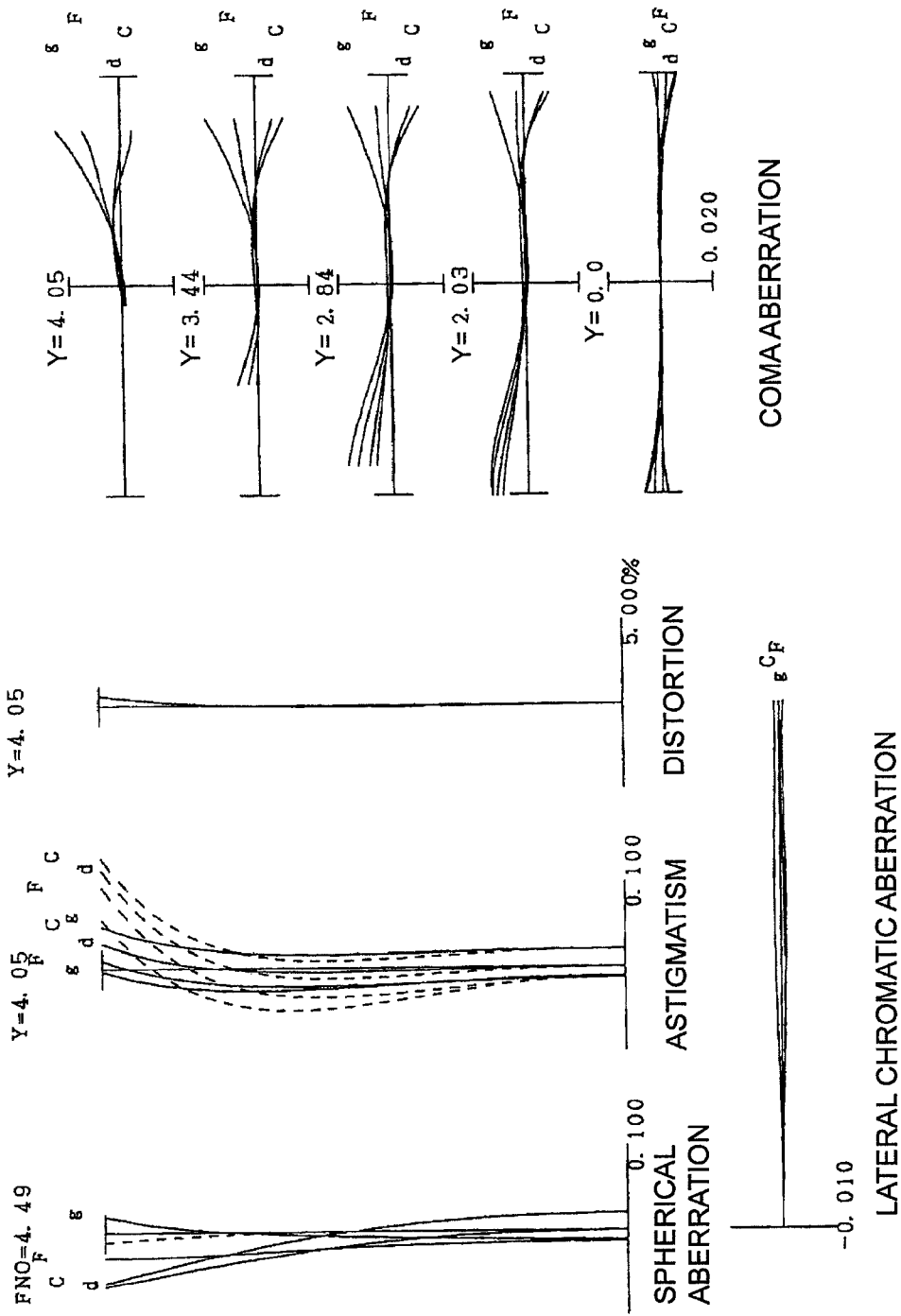

Preferred embodiments will now be described with reference to the drawings. As FIG. 1 shows, a zoom lens according to a first embodiment has, in order from an object, a first lens group G1 having positive refractive power including an optical element P (a rectangular prism in the case of the first embodiment) for deflecting the optical path, a second lens group G2 having negative refractive power, an aperture stop S for adjusting quality of light, a third lens group G3 having positive refractive power, a fourth lens group G4 having positive refractive power and a fifth lens group G5 having negative refractive power. By this configuration of providing negative refractive power to the fifth lens group G5, the total lens length can be decreased, which contributes to downsizing.

The third lens group G3 consists of a plurality of lenses. In concrete terms, the third lens group G3 has, in order from an object, a lens having positive refractive power (lens L31 in FIG. 1), and a cemented lens of a lens having positive refractive power (lens L32 in FIG. 1) and a lens having negative refractive power (lens L33 in FIG. 1). This configuration can improve the fluctuation of lateral chromatic aberration due to zooming, and correction of coma aberration and spherical aberration.

Based on this configuration, the zoom lens satisfies the following conditional expressions (1) and (2):

$$1.00 < PL/fW < 1.75 \quad (1)$$

$$0.30 < PL/fT < 0.45 \quad (2)$$

where PL denotes an optical path length of the optical element P for deflecting the optical path, fW denotes a focal length of the zoom lens in the wide angle end state, and fT denotes a focal length of the zoom lens in the telephoto end state.

Conditional Expression (1) specifies an appropriate ratio of the optical path length PL of the optical element P for deflecting the optical path and the focal length fW of the zoom lens in the wide angle end state. If the upper limit value of this conditional Expression (1) is exceeded, the optical path length PL of the optical element P for deflecting the optical path with respect to the focal length fW becomes long, which is not preferable. Also, fluctuation of astigmatism due to zooming also increases, and the above mentioned aberration correction becomes difficult, which is not preferable. If the lower limit value of the conditional Expression (1) is not reached, on the other hand, fluctuation of the lateral chromatic aberration and coma aberration due to zooming increases, and the above mentioned aberration correction becomes difficult, which is not preferable.

To ensure the effect of the first embodiment, it is preferable to set the upper limit value of the conditional Expression (1) to 1.65.

Also to ensure the effect of the first embodiment, it is preferable to set the lower limit value of the conditional Expression (1) to 1.50. To further ensure the effect of the first embodiment, it is preferable to set the lower limit value of the conditional Expression (1) to 1.60.

The conditional Expression (2) specifies an appropriate ratio of the optical path length PL of the optical element P for deflecting the optical path and the focal length fT of the zoom lens in the telephoto end state. If the upper limit value of this conditional Expression (2) is exceeded, the optical path length PL of the optical element P for deflecting the optical path with respect to the focal length fT becomes long, which is not preferable. Correction of astigmatism also becomes difficult, which is not preferable. If the lower limit value of the conditional Expression (2) is not reached, on the other hand, correction of lateral chromatic aberration and coma aberration becomes difficult, which is not preferable.

To ensure the effect of the first embodiment, it is preferable to set the upper limit value of the conditional Expression (2) to 0.40.

Also to insure the effect of the first embodiment, it is preferable to set the lower limit value of the conditional Expression (2) to 0.32.

In the first embodiment, it is preferable that the first lens group G1, the aperture stop S and the third lens group G3 are in fixed positions on the optical axis upon zooming from the wide angle end state to the telephoto end state, and the second lens group G2, the fourth lens group G4 and the fifth lens group G5 are moved upon zooming from the wide angle end state to the telephoto end state. As a result, the first lens group G1 closest to the object is always fixed upon zooming from the wide angle end state to the telephoto end state (zooming and focusing), so the largest group in the zoom lens need not be operated, and the structure can be simplified. Since zooming is performed by a lens group other than the first lens group G1, which is the largest lens group, a smaller drive system than the prior art can be used, which contributes to downsizing of the zoom lens. By moving the fifth lens group G5 upon zooming, astigmatism can be more easily corrected.

In the first embodiment, it is preferable to satisfy the following conditional Expression (3), $$1.0 < fG3/fG4 < 2.0 \quad (3)$$

where fG3 denotes a focal length of the third lens group G3, and fG4 denotes a focal length of the fourth lens group G4.

The conditional Expression (3) specifies an appropriate ratio of the focal length fG3 of the third lens group G3 and the focal length fG4 of the fourth lens group G4. If the upper limit value of this conditional Expression (3) is exceeded, it becomes difficult to appropriately correct fluctuation of the lateral chromatic aberration due to zooming, which is not preferable. If the lower limit value of the conditional Expression (3) is not reached, on the other hand, it becomes difficult to appropriately correct spherical aberration, which is not preferable.

To ensure the effect of the first embodiment, it is preferable to set the upper limit value of the conditional Expression (3) to 1.7.

To also ensure the effect of the first embodiment, it is preferable to set the lower limit value of the conditional Expression (3) to 1.2.

In the first embodiment, it is preferable that the first lens group G1 has, in order from an object, a lens having negative refractive power (lens L11 in FIG. 1), an optical element for deflecting the optical path (prism P in FIG. 1) and a lens having positive refractive power (lens L12 in FIG. 1). By this configuration, the lateral chromatic aberration and coma aberration in the wide angle end state can be appropriately corrected.

In the first embodiment, it is preferable that at least one of the fourth lens group G4 and the fifth lens group G5 is one cemented lens. By this configuration, fluctuation of lateral chromatic aberration due to zooming can be appropriately corrected.

In the first embodiment, it is preferable that at least one of the fourth lens group G4 and the fifth lens group G5 has a cemented lens of a lens having positive refractive power and a lens having negative refractive power. By this configuration, fluctuation of lateral chromatic aberration due to zooming can be appropriately corrected.

Now a zoom lens according to the second embodiment will be described. The zoom lens according to the second embodiment also has, in order from an object, a first lens group G1 having positive refractive power including an optical element P (a rectangular prism in the case of the second embodiment) for deflecting the optical path, a second lens group G2 having negative refractive power, an aperture stop S for adjusting quantity of light, a third lens group G3 having positive refractive power, a fourth lens group G4 having positive refractive power, and a fifth lens group G5 having negative refractive power, just like the first embodiment, as FIG. 1 shows. By this configuration of providing negative refractive power to the fifth lens group G5, the total lens length can be decreased, which contributes to downsizing.

The third lens group G3 has, in order from an object, a lens having positive refractive power (lens L31 in FIG. 1) and a cemented lens of a lens having positive refractive power (lens L32 in FIG. 1) and a lens having negative refractive power (lens L33 in FIG. 1). By this configuration, fluctuation of lateral chromatic aberration due to zooming, and correction of comma aberration and spherical aberration can be appropriately corrected.

Based on this configuration, this zoom lens satisfies the following conditional Expressions (1) and (4):

$$1.5 < PL/fW < 3.0 \quad (1)$$

$$0.0 < PL/PWL < 0.17 \quad (4)$$

where PL denotes an optical path length of the optical element P, fW denotes a focal length of the zoom lens in the wide angle end state, and PWL denotes an optical axis length of the optical element P from the entrance plane to the imaging plane. Expression (1) is the same as the above mentioned Expression (1) of the first embodiment, but the conditional values thereof are different.

Conditional Expression (1) specifies an appropriate ratio of the optical path length PL of the optical element P for deflecting the optical path and the focal length fW of the zoom lens in the wide angle end state. If the upper limit value of this conditional Expression (1) is exceeded, the optical path length PL of the optical element P for deflecting the optical path with respect to the focal length fW becomes long, which is not preferable. Also, fluctuation of astigmatism due to zooming also increases, and the above mentioned aberration correction becomes difficult, which is not preferable. If the lower limit value of the conditional Expression (1) is not reached, on the other hand, fluctuation of the lateral chromatic aberration and coma aberration due to zooming increases, and the above mentioned aberration correction becomes difficult, which is not preferable.

To ensure the effect of the second embodiment, it is preferable to set the upper limit value of the conditional Expression (1) to 2.0. To further ensure the effect of the second embodiment, it is preferable to set the upper limit value of the conditional Expression (1) to 1.8.

To also ensure the effect of the second embodiment, it is preferable to set the lower limit value of the conditional Expression (1) to 1.6.

The conditional Expression (4) specifies an appropriate ratio of the optical path length PL of the optical element P for deflecting the optical path and the optical axis length PWL of the optical element P from the entrance plane to the imaging plane. If the upper limit value of this conditional Expression (4) is exceeded, the optical path length PL of the optical element P for deflecting the optical path with respect to the optical axis length PWL becomes long, which is not preferable. Also fluctuation of lateral chromatic aberration and coma aberration due to zooming increases, and the above mentioned aberration correction becomes difficult, which is not desirable. If the lower limit value of conditional Expression (4) is not reached, on the other hand, fluctuation of astigmatism due to zooming increases, and this aberration correction becomes difficult, which is not preferable.

To ensure the effect of the second embodiment, it is preferable to set the upper limit value of the conditional Expression (4) to 0.16.

In the second embodiment, it is preferable that the first lens group G1, the aperture stop S and the third lens group G3 are in fixed positions on the optical axis upon zooming from the wide angle end state to the telephoto end state, and the second lens group G2, the fourth lens group G4 and the fifth lens group G5 are moved upon zooming from the wide angle end state to the telephoto end state. As a result, the first lens group G1 closest to the object is fixed in a position on the optical axis upon zooming from the wide angle end state to the telephoto end state (zooming and focusing), so the largest group in the zoom lens need not be operated, and the structure can be simplified. Since zooming (or focusing) is performed by a lens group other than the first lens group G1, which is the largest lens group, a smaller drive system than the prior art can be used, which contributes to downsizing of the zoom lens. By moving the fifth lens group G5 upon zooming, astigmatism can be more easily corrected.

In the second embodiment, it is preferable to satisfy the following conditional Expression (3), $$1.0 < fG3/fG4 < 2.0 \quad (3)$$

where fG3 denotes a focal length of the third lens group G3, and fG4 denotes a focal length of the fourth lens group G4. The Expression (1) is the same as the above mentioned Expression (1) of the first embodiment.

The conditional Expression (3) specifies an appropriate ratio of the focal length fG3 of the third lens group G3 and the focal length fG4 of the fourth lens group G4. If the upper limit value of this conditional Expression (3) is exceeded, it becomes difficult to appropriately correct fluctuation of the lateral chromatic aberration due to zooming, which is not preferable. If the lower limit value of the conditional Expression (3) is not reached, on the other hand, it becomes difficult to appropriately correct spherical aberration, which is not preferable.

To ensure the effect of the second embodiment, it is preferable to set the upper limit value of the conditional Expression (3) to 1.7.

To also ensure the effect of the second embodiment, it is preferable to set the lower limit value of the conditional Expression (3) to 1.2.

In the second embodiment, it is preferable that the first lens group G1 has, in order from an object, a lens having negative refractive power (lens L11 in FIG. 1), an optical element for deflecting the optical path (prism P in FIG. 1) and a lens having positive refractive power (lens L12 in FIG. 1). By this configuration, the lateral chromatic aberration and coma aberration in the wide angle end state can be appropriately corrected.

In the second embodiment, it is preferable that at least one of the fourth lens group G4 and the fifth lens group G5 is one cemented lens. By this configuration, fluctuation of lateral chromatic aberration due to zooming can be appropriately corrected.

In the second embodiment, it is preferable that at least one of the fourth lens group G4 and the fifth lens group G5 has a cemented lens of a lens having positive refractive power and a lens having negative refractive power. By this configuration, fluctuation of lateral chromatic aberration due to zooming can be appropriately corrected.

Figure 9A:
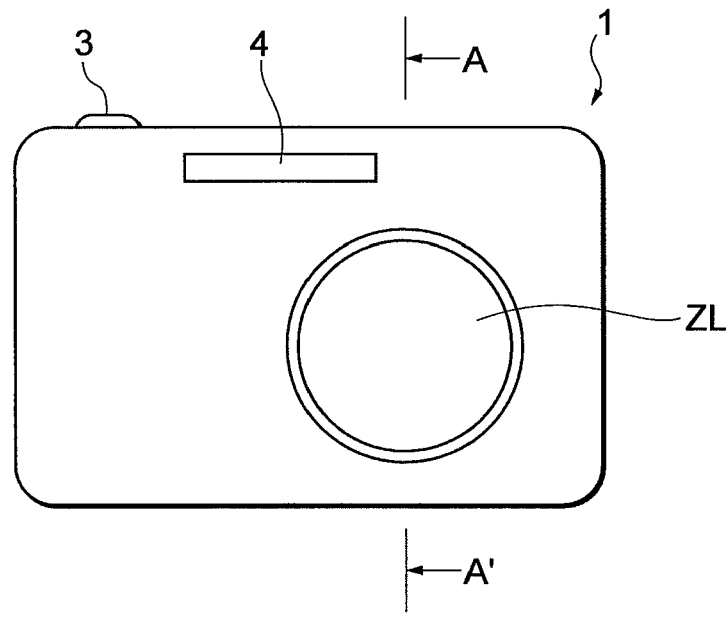
FIG. 9A is a front view of a digital still camera.
Figure 9B:
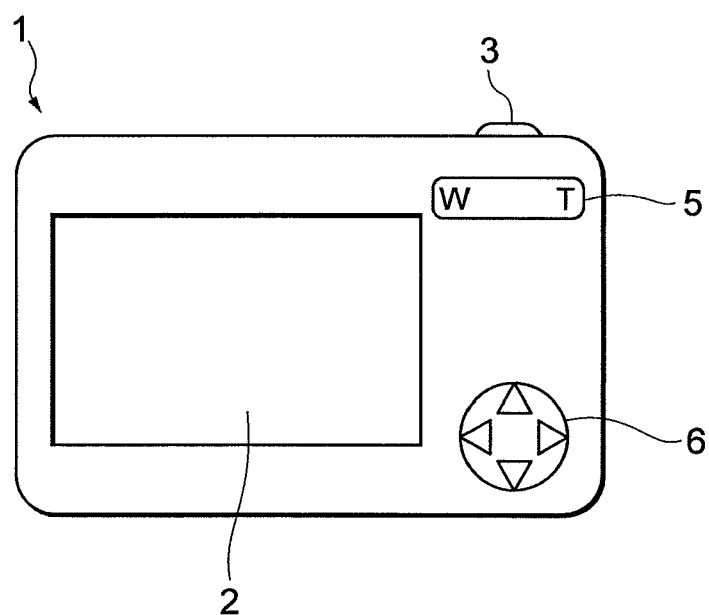
FIG. 9B is a rear view of the digital still camera.
Figure 10:
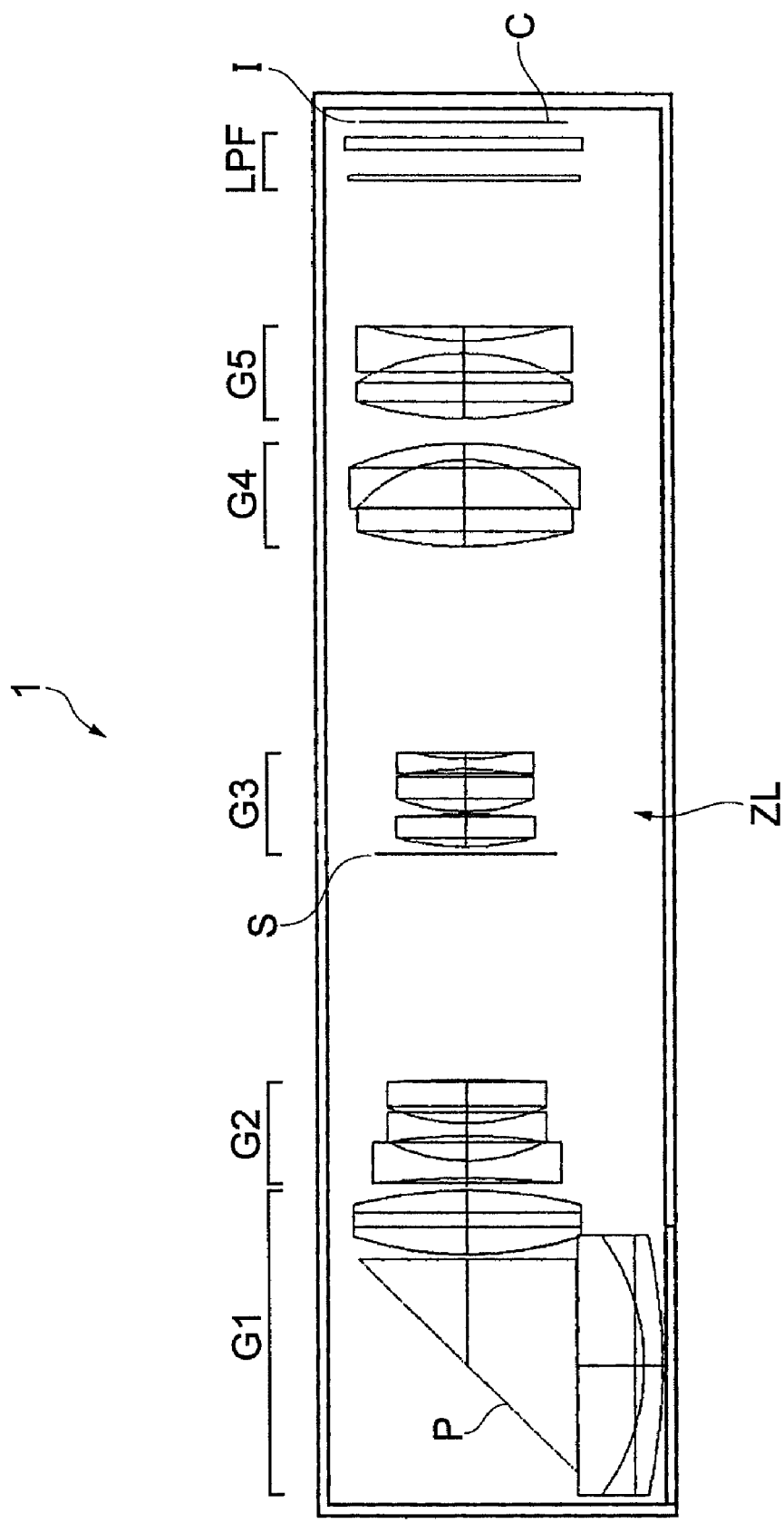
FIG. 10 is a cross-sectional view sectioned along II to II' in FIG. 9A.

FIG. 9 and FIG. 10 show a digital still camera CAM (optical apparatus) having the above mentioned zoom lens as the imaging lens ZL. When a power button, which is not illustrated, of this digital still camera CAM is pressed, a shutter, which is not illustrated, of the imaging lens ZL is opened, lights from an object are condensed by the imaging lens ZL, and an image is formed on an image sensing element C (e.g. CCD and CMOS) disposed on the imaging plane I. The object image formed on the image sensing element C is displayed on a liquid crystal monitor M disposed on the back of the digital still camera CAM. The user determines the composition of the object image by viewing the liquid crystal monitor M, then presses the release button B1 down to shoot the object image by the image sensing element C, and records and stores the image in a memory, which is not illustrated.

In this digital still camera CAM, an auxiliary light emission unit D, for emitting auxiliary light when the object is dark, a wide (W)-tele (T) button B2 used for zooming the imaging lens ZL from the wide angle end state (W) to the telephoto end state (T), and function buttons B3 to be used for setting various conditions of the digital still camera CAM, are disposed.

Figure 11:
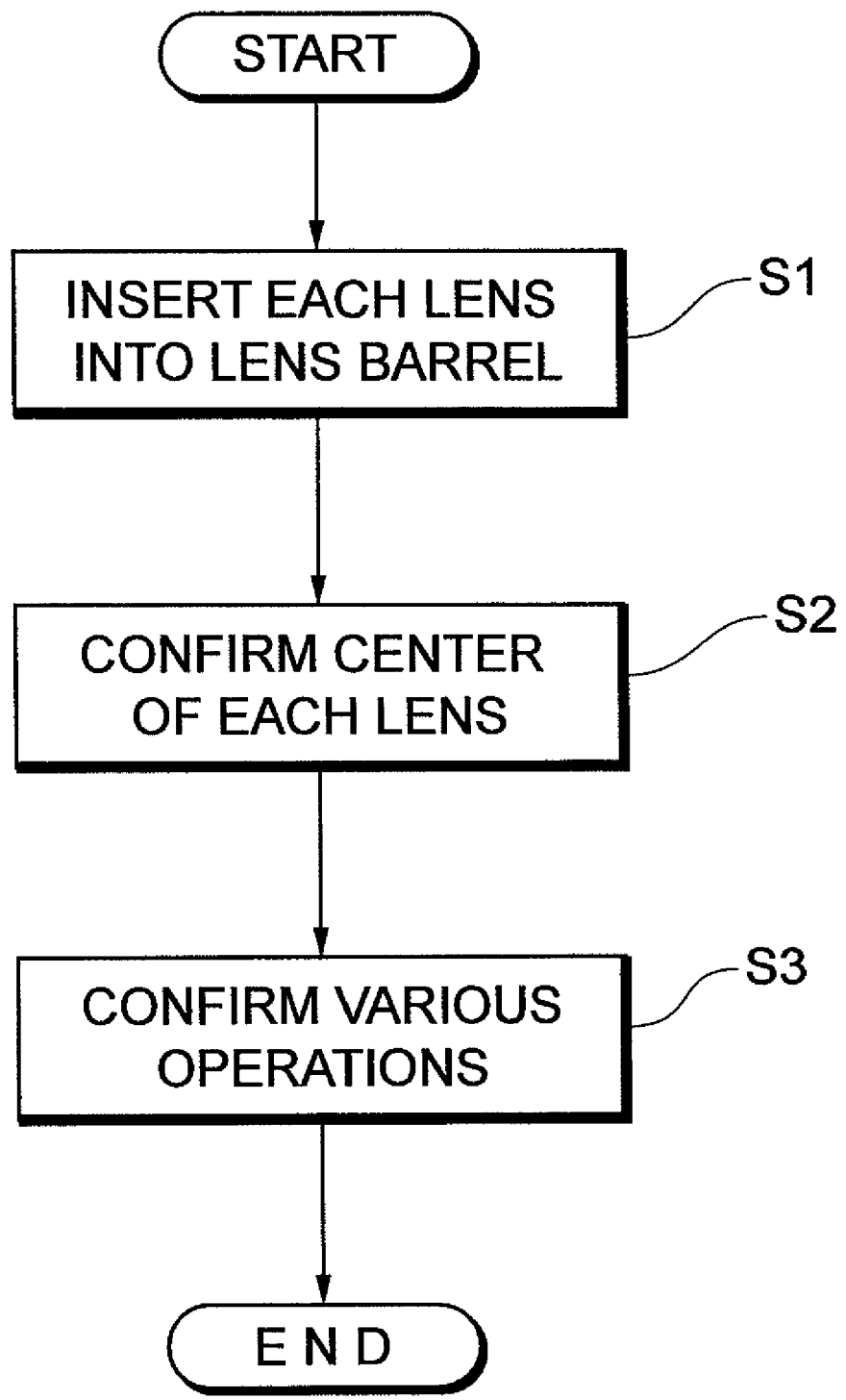
FIG. 11 is a flow chart depicting a manufacturing method for the zoom lens according to the present embodiment.

Now a manufacturing method for the zoom lens having the above configuration will be described with reference to FIG. 11. First each lens is inserted into a cylindrical lens barrel (step S1). When the lenses are inserted into the lens barrel, each lens may be inserted into the lens barrel one at a time in a sequence along the optical axis, or a part or all of the lenses are integrated and held by a holding element, and is assembled with the lens barrel element. After each lens is inserted into the lens barrel, it is confirmed whether an image of an object is formed, that is, whether the center of each lens is aligned, in a state where each lens is inserted in the lens barrel (step S2). Then various operations of the zoom lens are confirmed (step S3). Examples of the various operations are a zooming operation for zooming from the wide angle end state to the telephoto end state, a focusing operation for moving lenses for focusing from a distant object to a close object, along the optical axis, and a motion blur correction operation in which at least a part of the lenses move so as to have components perpendicular to the optical axis. The sequence of confirming each operation is arbitrary.

EXAMPLES

Concrete examples will now be described with reference to the drawings. Table 1 to Table 4 shown below are tables of each parameter according to Example 1 to Example 4. In all parameters, f is a focal length of this zoom lens, FNO is an F number, ω is a half angle view, Y is an image height, TL is a total lens length, and Bf is a back focus. In lens data, a surface number is a sequence of the lens surface from the object side along the light traveling direction, r is a radius of curvature of each lens surface, d is a surface distance which is a distance from each optical plane to the next plane (or imaging plane), nd is a refractive index with respect to the d-line (wavelength: 587.6 nm), and νd is an Abbe number with respect to the d-line. If the lens surface is aspherical, the surface number is marked with an "*", and a paraxial radius of curvature is shown in the column of the radius of curvature r. "∞" of the radius of curvature shows a plane or an aperture. The refractive index "1.00000" of air is omitted. In zooming data, di is a variable surface distance of the i-th surface (i is an integer) in each state of the wide angle end state, intermediate focal length state and telephoto end state. In zoom lens group data, the first surface and focal length of each group are shown. In a conditional expression, values corresponding to the above mentioned conditional Expression (1) to (4) are shown.

In aspherical data, the shape of the aspherical surface shown in the lens data is shown by the following Expression (a). In other words, the following Expression (a) is used, where y denotes the height in a direction perpendicular to the optical axis, S(y) denotes a distance (sag amount) along the optical axis from the tangential plane at the vertex of the of the aspherical surface to the position on the aspherical surface at height y, r denotes a radius of curvature (paraxial radius of curvature) of the reference spherical surface, κ denotes a conical coefficient, and An denotes an aspherical coefficient of degree n. In each example, an aspherical coefficient A2 of degree 2 is 0, which is omitted. En indicates $\times 10^n$. For example, $1.234E-05=1.234\times10^{-5}$.

$$S(y)=(y^2/r)/\{1+(1-\kappa \cdot y^2/r^2)^{1/2}\}+A4\times y^4+A6\times y^6+A8\times y^8+A10\times y^{10} \tag{a}$$

In the tables, normally "mm" is used for the unit of focal length f, radius of curvature r, surface distance d, and other lengths. The unit of the optical system, however, is not limited to "mm", but can be other appropriate units since an equivalent optical performance can be acquired even if the optical system is proportionally expanded or proportionally reduced.

This description on the tables are the same for other examples, and therefore description is omitted for other examples.

Example 1

Example 1 will now be described with reference to FIG. 1, FIG. 2 and Table 1. FIG. 1 shows a configuration of the zoom lens according to Example 1, and also shows the change of the focal length state, from the wide angle end state (W) (via the intermediate focal length state) to the telephoto end state (T), that is, the state of movement of each lens group upon zooming. In the zoom lens according to Example 1, the optical path is polarized by 90° using a rectangular prism P (optical element for deflecting the optical path) as shown in FIG. 10, but FIG. 1 shows the developed view thereof.

The zoom lens according to Example 1 has, in order from an object, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 has, in order from the object, a negative meniscus lens L11 having a convex surface facing the object, a rectangular prism P for deflecting the optical path 90°, and a biconvex positive lens L12.

The second lens group G2 has, in order from the object, a biconcave negative lens L21, and a cemented lens of a biconcave negative lens L11 and a biconvex positive lens L23.

The third lens group G3 has, in order from the object, a biconvex positive lens L31, and a cemented lens of a biconvex positive lens L32 and a biconcave negative lens L33.

The fourth lens group G4 has, a cemented lens of a biconvex positive lens L41 and a negative meniscus lens L42 having a convex surface facing the image, in order from the object.

The fifth lens group G5 has a cemented lens of a biconvex positive lens L51 and a biconcave negative lens L52, in order from the object.

An aperture stop S, for adjusting quality of light, is disposed between the second lens group G2 and the third lens group G3.

A low pass filter LPF, for cutting spacial frequency that exceeds a critical resolution of the solid image sensing element, is disposed between the fifth lens group G5 and the imaging plane I. The imaging plane I is formed on the image sensing element, which is not illustrated, and the image sensing element is comprised of a CCD and CMOS.

In the zoom lens of this example having the above configuration, the first lens group G1, the aperture stop S and the third lens group G3 are always fixed with respect to the imaging plane I, and the second lens group G2, the fourth lens group G4 and the fifth lens group G5 are moved upon zooming from the wide angle end state to the telephoto end state.

Table 1 shows a table of each parameter in Example 1. The surface numbers 1 to 27 in Table 1 correspond to the surfaces 1 to 27 in FIG. 1. In Example 1, the fifth surface, sixth surface, eighth surface, fourteenth surface and eighteenth surface all have aspherical shapes.

TABLE 1

[lens data]

| m | r | d | nd | νd |
|---|---|---|---|---|
| object surface | ∞ | | | |
| 1 | 27.7315 | 0.7000 | 1.922860 | 20.88 |
| 2 | 9.0107 | 2.6800 | | |
| 3 | ∞ | 8.4000 | 1.846660 | 23.78 |
| 4 | ∞ | 0.2000 | | |
| *5 | 13.4490 | 2.5500 | 1.693500 | 53.22 |
| *6 | −16.9884 | d6 | | |
| 7 | −33.2204 | 0.7000 | 1.765460 | 46.73 |
| *8 | 6.2472 | 1.0000 | | |
| 9 | −15.7537 | 0.5000 | 1.882997 | 40.76 |
| 10 | 8.3323 | 1.8000 | 1.922860 | 20.88 |
| 11 | −36.3999 | d11 | | |
| 12 | ∞ | 0.3000 | (aperture stop S) | |
| 13 | 8.0796 | 1.3000 | 1.693500 | 53.22 |
| *14 | −36.4376 | 0.1000 | | |
| 15 | 6.9367 | 1.5500 | 1.518229 | 58.93 |
| 16 | −11.6360 | 0.4000 | 1.882997 | 40.76 |
| 17 | 7.2546 | d17 | | |
| *18 | 14.5309 | 3.4500 | 1.693500 | 53.22 |
| 19 | −5.5042 | 0.6500 | 1.903658 | 31.31 |
| 20 | −10.6985 | d20 | | |
| 21 | 17.0925 | 2.6000 | 1.603001 | 65.44 |
| 22 | −7.5018 | 0.5000 | 1.834000 | 37.16 |
| 23 | 16.5600 | d23 | | |
| 24 | ∞ | 0.2100 | 1.516330 | 64.14 |
| 25 | ∞ | 1.0000 | | |
| 26 | ∞ | 0.5000 | 1.516330 | 64.14 |
| 27 | ∞ | Bf | | |
| imaging plane | ∞ | | | |

[aspherical data]

fifth surface

κ = +1.0000, A4 = −8.08740E−05, A6 = −1.64960E−07,
A8 = −3.15350E−09, A10 = 0.00000E+00
sixth surface κ = +1.0000, A4 = +3.54910E−05, A6 = +8.39040E−08,
A8 = −3.95330E−09, A10 = 0.00000E+00

TABLE 1-continued eighth surface

κ = +1.0000, A4 = −4.94150E−04, A6 = −2.37680E−06,
A8 = −2.03850E−07, A10 = 0.00000E+00
fourteenth surface κ = +1.0000, A4 = +6.52730E−05, A6 = −9.40280E−07,
A8 = 0.00000E+00, A10 = 0.00000E+00
eighteenth surface κ = +0.0992, A4 = −1.09210E−04, A6 = +3.96910E−06,
A8 = 0.00000E+00, A10 = 0.000000E+00

[all parameters]
zoom ratio 4.70433

| | wide angle end | intermediate focal length | telephoto end |
|---|---|---|---|
| f | 5.15198~ | 10.14958~ | 24.23663 |
| FNO | 4.07957~ | 4.49619~ | 6.01030 |
| ω | 40.17430~ | 21.63392~ | 9.39484 |
| Y | 4.05000~ | 4.05000~ | 4.05000 |
| TL | 56.97959~ | 56.97892~ | 56.97717 |
| Bf | 0.59960~ | 0.59893~ | 0.59717 |

[zooming data]

| variable distance | wide angle end | intermediate focal length | telephoto end |
|---|---|---|---|
| d6 | 0.50000 | 5.12487 | 8.85015 |
| d11 | 8.95013 | 4.32527 | 0.59999 |
| d17 | 8.46078 | 5.49176 | 1.00000 |
| d20 | 1.00000 | 2.03367 | 1.80337 |
| d23 | 6.37908 | 8.31442 | 13.03648 |

[zoom lens group data]

| group No. | first surface of group | focal length of group |
|---|---|---|
| G1 | 1 | 14.40652 |
| G2 | 7 | −5.88007 |
| G3 | 13 | 16.11221 |
| G4 | 18 | 11.21984 |
| G5 | 21 | −24.30328 |

[Conditional expressions]

Conditional Expression (1)PL/fW = 1.63044
Conditional Expression (2)PL/fT = 0.34658
Conditional Expression (3)fG3/fG4 = 1.4360
Conditional Expression (4)PL/PWL = 0.15672

As the table of parameters in Table 1 shows, the zoom lens according to this example satisfies all the above conditional Expression (1) to (4).

Figure 2C:
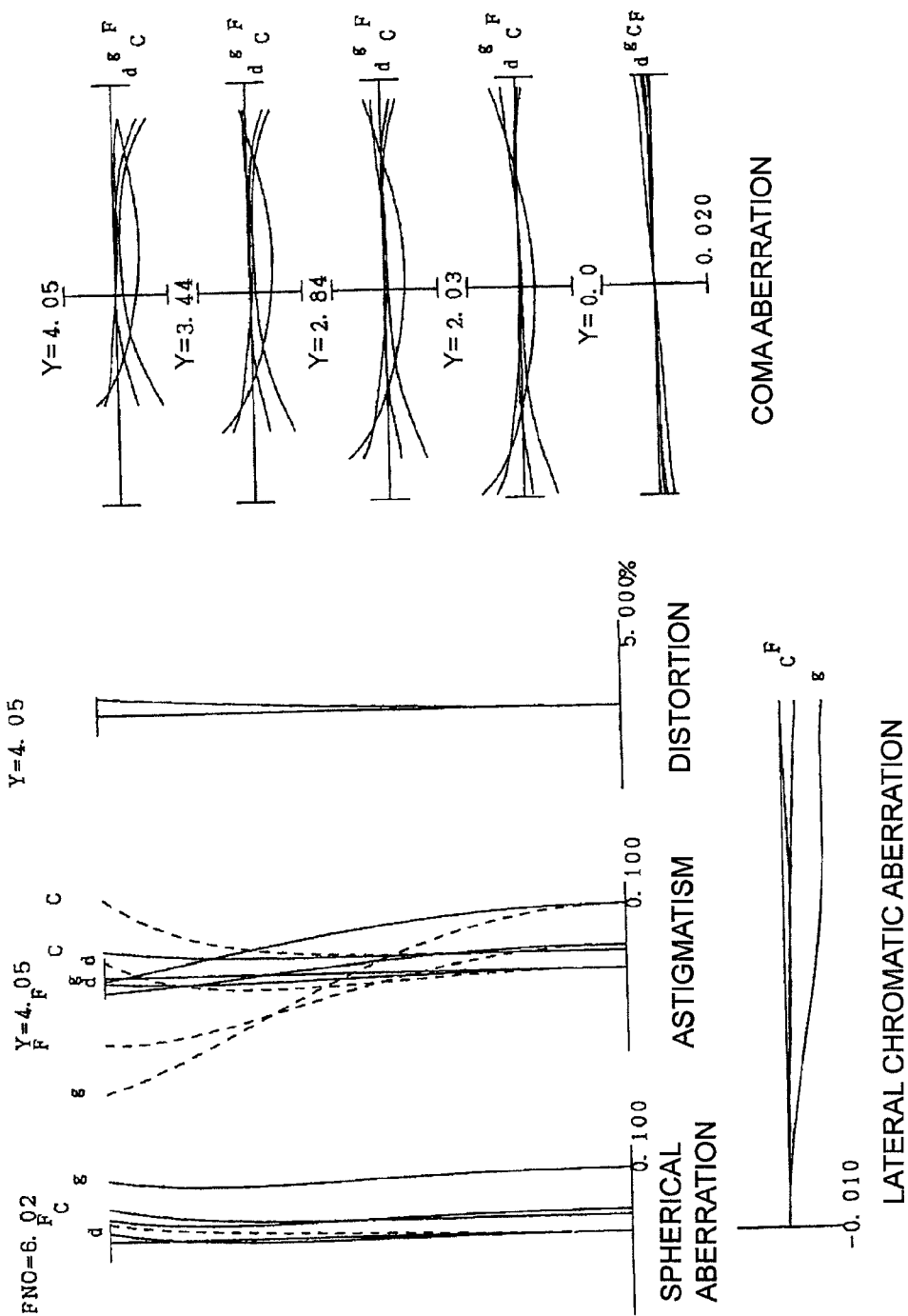

FIG. 2 shows graphs of various aberrations according to Example 1, where FIG. 2A are graphs showing various aberrations upon focusing on infinity in the wide angle end state, FIG. 2B are graphs showing various aberrations upon focusing on infinity in the intermediate focal length state, and FIG. 2C are graphs showing various aberrations upon focusing on infinity in the telephoto end state.

In each graph showing various aberrations, FNO indicate an F number, and Y indicates an image height. In the graph showing spherical aberration, the solid line indicates a spherical aberration, and the broken line indicates a sign condition. In the graph showing astigmatism, the sold line indicates a sagittal imaging plane, and the broken line indicates a meridional image plane. In the graph showing coma aberration, the solid line indicates the meridional coma. d indicates various aberrations with respect to the d-line (wavelength: 587.6 nm), g indicates with respect to the g-line (wavelength: 435.8 nm), C indicates with respect to the C-line (wavelength: 656.3 nm), and F indicates with respect to the F-line (wavelength: 486.1 nm), and various aberrations with no indication are values with respect to the d-line respectively. This description on graphs showing aberrations is the same for other examples, and therefore the description is omitted for other examples.

As seen in each graph showing various aberrations, in Example 1, the zoom ratio is ×4.5 or more, and various aberrations are appropriately corrected in each focal length state from the wide angle end state to the telephoto end state, therefore an excellent imaging performance can be implemented.

Example 2

Example 2 will now be described with reference to FIG. 3, FIG. 4 and Table 2. FIG. 3 shows a configuration of the zoom lens according to Example 2, and also shows the change of the focal length state, from the wide angle end state (W) (via the intermediate focal length state) to the telephoto end state (T), that is, the state of movement of each lens group upon zooming. In the zoom lens according to Example 2, the optical path is polarized by 90° using a rectangular prism P (optical element for deflecting the optical path) as shown in FIG. 10, but FIG. 3 shows the developed view thereof.

The zoom lens according to Example 2 has, in order from an object, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 has, in order from the object, a negative meniscus lens L11 having a convex surface facing the object, a rectangular prism P for deflecting the optical path 90°, and a biconvex positive lens L12.

The second lens group G2 has, in order from the object, a biconcave negative lens L21, and a cemented lens of a biconcave negative lens L22 and a biconvex positive lens L23.

The third lens group G3 has, in order from the object, a biconvex positive lens L31, and a cemented lens of a biconvex positive lens L32 and a biconcave negative lens L33.

The fourth lens group G4 has, a cemented lens of a biconvex positive lens L41 and a negative meniscus lens L42 having a convex surface facing the image, in order from the object.

The fifth lens group G5 has a cemented lens of a biconvex positive lens L51 and a biconcave negative lens L52, in order from the object.

An aperture stop S, for adjusting quality of light, is disposed between the second lens group G2 and the third lens group G3.

A low pass filter LPF, for cutting spacial frequency that exceeds a critical resolution of the solid image sensing element, is disposed between the fifth lens group G5 and the imaging plane I. The imaging plane I is formed on the image sensing element, which is not illustrated, and the image sensing element is comprised of a CCD and CMOS.

In the zoom lens of this example having the above configuration, the first lens group G1, the aperture stop S and the third lens group G3 are always fixed with respect to the imaging plane I, and the second lens group G2, the fourth lens group G4 and the fifth lens group G5 are moved upon zooming from the wide angle end state to the telephoto end state.

Table 2 shows a table of each parameter in Example 2. The surface numbers 1 to 27 in Table 2 correspond to the surfaces 1 to 27 in FIG. 3. In Example 2, the fifth surface, sixth surface, eighth surface, fourteenth surface and eighteenth surface all have aspherical shapes.

TABLE 2

[lens data]

| m | r | d | nd | vd |
|---|---|---|---|---|
| object surface | ∞ | | | |
| 1 | 28.0669 | 0.7000 | 1.922860 | 20.88 |
| 2 | 9.0068 | 2.6800 | | |
| 3 | ∞ | 8.4000 | 1.846660 | 23.78 |
| 4 | ∞ | 0.2000 | | |
| *5 | 13.4622 | 2.5500 | 1.693500 | 53.22 |
| *6 | −17.3557 | d6 | | |
| 7 | −34.4164 | 0.7000 | 1.765460 | 46.73 |
| *8 | 6.3406 | 1.0000 | | |
| 9 | −20.2197 | 0.5000 | 1.882997 | 40.76 |
| 10 | 7.3962 | 1.8000 | 1.922860 | 20.88 |
| 11 | −76.1310 | d11 | | |
| 12 | ∞ | 0.3000 | (aperture stop S) | |
| 13 | 8.9612 | 1.3000 | 1.693500 | 53.22 |
| *14 | −31.5432 | 0.1000 | | |
| 15 | 6.9664 | 1.5500 | 1.518229 | 58.93 |
| 16 | −12.2345 | 0.4000 | 1.882997 | 40.76 |
| 17 | 7.8809 | d17 | | |
| *18 | 14.0041 | 3.4500 | 1.693500 | 53.22 |
| 19 | −5.5107 | 0.6500 | 1.903658 | 31.31 |
| 20 | −10.7103 | d20 | | |
| 21 | 16.3845 | 2.6000 | 1.603001 | 65.44 |
| 22 | −7.2652 | 0.5000 | 1.834000 | 37.16 |
| 23 | 14.1600 | d23 | | |
| 24 | ∞ | 0.2100 | 1.516330 | 64.14 |
| 25 | ∞ | 1.0000 | | |
| 26 | ∞ | 0.5000 | 1.516330 | 64.14 |
| 27 | ∞ | Bf | | |
| imaging plane | ∞ | | | |

[aspherical data]

fifth surface $\kappa = +1.0000, A4 = -8.75640E-05, A6 = -9.22050E-08,$
$A8 = -6.82360E-09, A10 = 0.00000E+00$ sixth surface $\kappa = +1.0000, A4 = +2.29280E-05, A6 = +1.15360E-07,$
$A8 = -5.28810E-09, A10 = 0.00000E+00$ eighth surface $\kappa = +1.0000, A4 = -4.43690E-04, A6 = -3.31190E-06,$
$A8 = -3.39010E-08, A10 = 0.00000E+00$ fourteenth surface $\kappa = +1.0000, A4 = +3.67380E-05, A6 = -5.00970E-07,$
$A8 = 0.00000E+00, A10 = 0.00000E+00$ eighteenth surface $\kappa = +3.7416, A4 = -2.77250E-04, A6 = +2.04260E-06,$
$A8 = 0.00000E+00, A10 = 0.00000E+00$

[all parameters]
zoom ratio 4.70426

| | wide angle end | intermediate focal length | telephoto end |
|---|---|---|---|
| f | 5.15199~ | 10.14958~ | 24.23632 |
| FNO | 4.08367~ | 4.47159~ | 6.06960 |
| ω | 40.16795~ | 21.66401~ | 9.39123 |
| Y | 4.05000~ | 4.05000~ | 4.05000 |
| TL | 56.97964~ | 56.97889~ | 56.97701 |
| Bf | 0.59964~ | 0.59890~ | 0.59699 |

[zooming data]

| variable distance | wide angle end | intermediate focal length | telephoto end |
|---|---|---|---|
| d6 | 0.50000 | 5.20480 | 8.85022 |
| d11 | 8.95018 | 4.24539 | 0.60000 |
| d17 | 8.66600 | 5.68519 | 1.00000 |

TABLE 2-continued

| | | | |
|---|---|---|---|
| d20 | 1.00000 | 2.18190 | 2.42232 |
| d23 | 6.17383 | 7.97272 | 12.41749 |

[zoom lens group data]

| group No. | first surface of group | focal length of group |
|---|---|---|
| G1 | 1 | 14.71707 |
| G2 | 7 | −5.84281 |
| G3 | 13 | 15.88709 |
| G4 | 18 | 11.03087 |
| G5 | 21 | −20.67584 |

[Conditional expressions]

Conditional Expression (1)PL/fW = 1.63044
Conditional Expression (2)PL/fT = 0.34659
Conditional Expression (3)fG3/fG4 = 1.4402
Conditional Expression (4)PL/PWL = 0.15672

As the table of parameters in Table 2 shows, the zoom lens according to this example satisfies all the above conditional Expression (1) to (4).

Figure 4A:
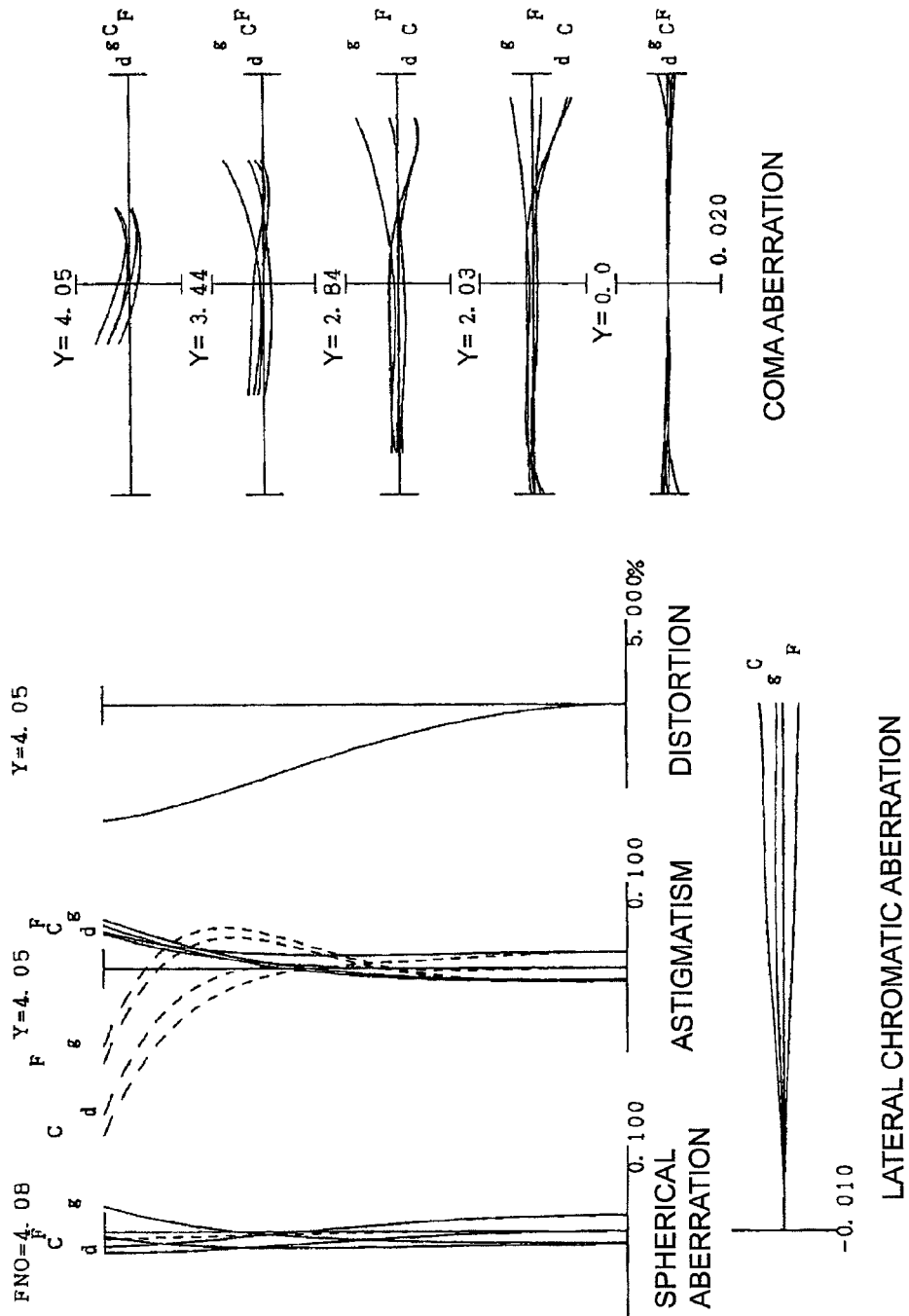
FIG. 4A to FIG. 4C are graphs showing various aberrations of the zoom lens according to Example 2, where FIG. 4A are graphs showing various aberrations upon focusing on infinity in the wide angle end state, FIG. 4B are graphs showing various aberrations upon focusing on infinity in the intermediate focal length state, and FIG. 4C are graphs showing various aberrations upon focusing on infinity in the telephoto end state.
Figure 4B:
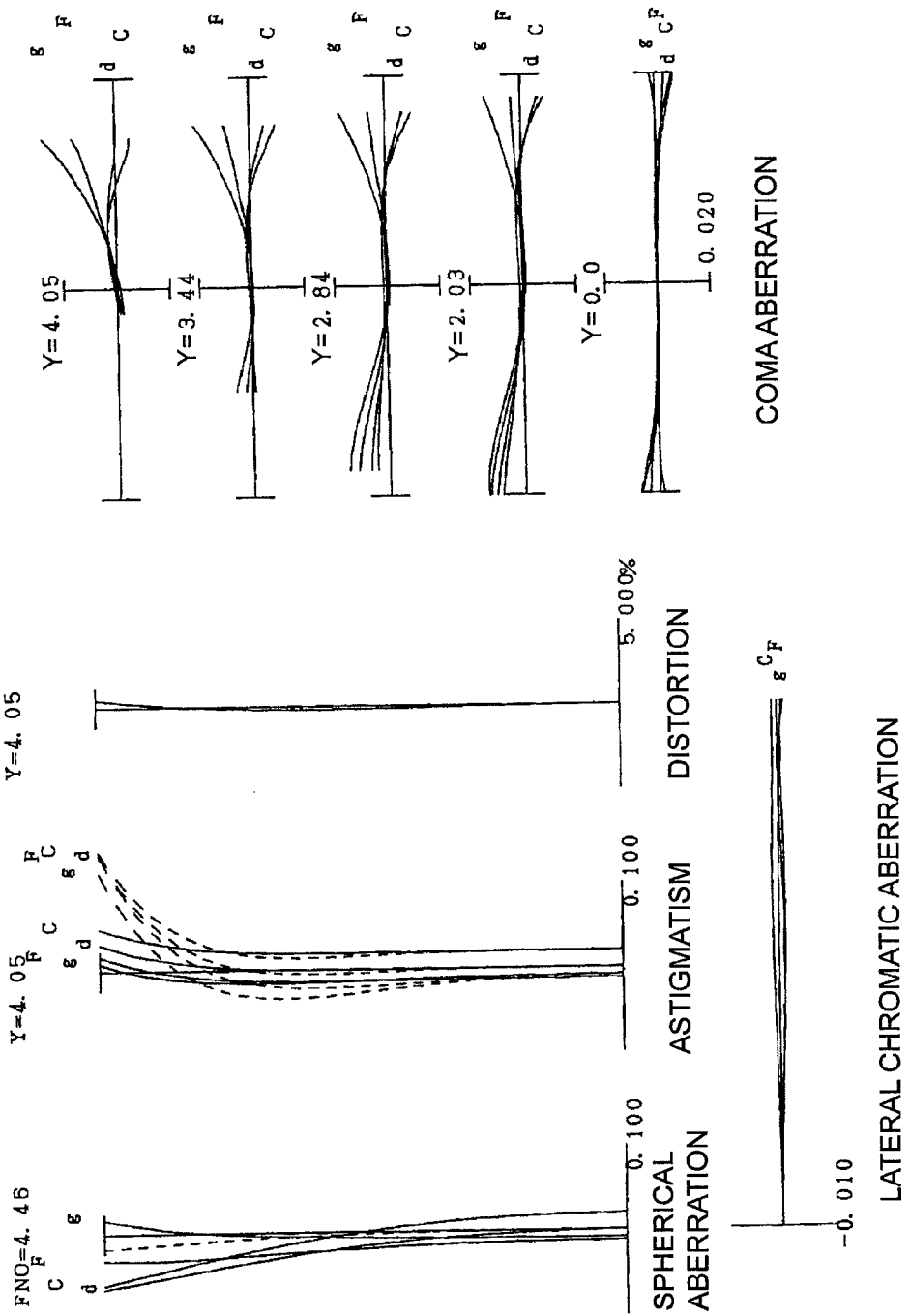
Figure 4C:
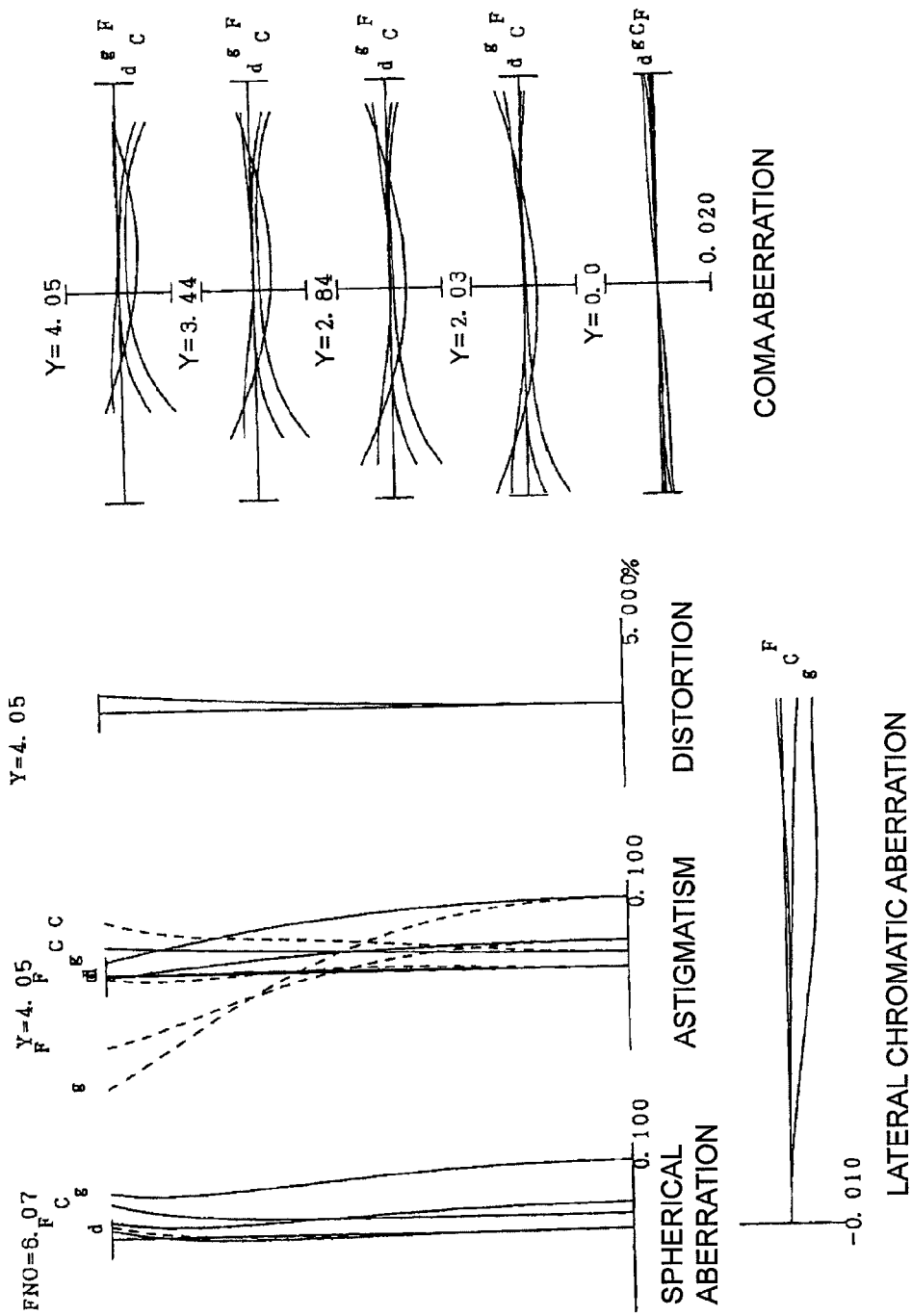

FIG. 4 shows graphs of various aberrations according to Example 2, where FIG. 4A are graphs showing various aberrations upon focusing on infinity in the wide angle end state, FIG. 4B are graphs showing various aberrations upon focusing on infinity in the intermediate focal length state, and FIG. 4C are graphs showing various aberrations upon focusing on infinity in the telephoto end state. As seen in the graphs showing each aberration, according to Example 2, various aberrations in each focal length state from the wide angle end state to the telephoto end state can be appropriately corrected, and an excellent imaging performance can be implemented.

Example 3

Figure 5:
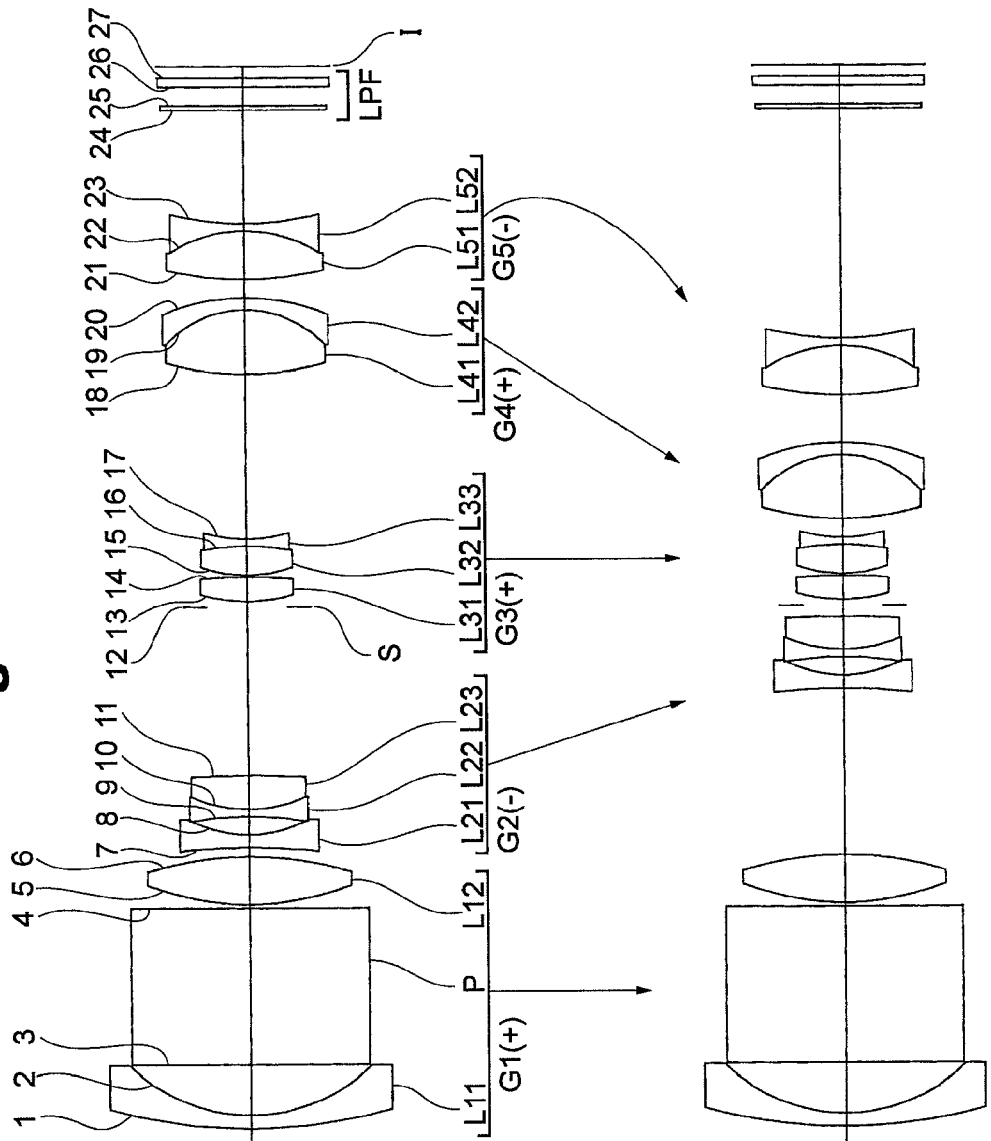
FIG. 5 is a cross-sectional view depicting a configuration of a zoom lens according to Example 3, where (W) shows a state of focusing on infinity in the wide angle end state, and (T) shows a state of focusing on infinity in the telephoto end state.

Example 3 will now be described with reference to FIG. 5, FIG. 6 and Table 3. FIG. 5 shows a configuration of the zoom lens according to Example 3, and also shows the change of the focal length state, from the wide angle end state (W) (via the intermediate focal length state) to the telephoto end state (T), that is, the state of movement of each lens group upon zooming. In the zoom lens according to Example 3, the optical path is polarized by 90° using a rectangular prism P (optical element for deflecting the optical path) as shown in FIG. 10, but FIG. 5 shows the developed view thereof.

The zoom lens according to Example 3 has, in order from an object, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 has, in order from the object, a negative meniscus lens L11 having a convex surface facing the object, a rectangular prism P for deflecting the optical path 90°, and a biconvex positive lens L12.

The second lens group G2 has, in order from the object, a biconcave negative lens L21, and a cemented lens of a biconcave negative lens L22 and a biconvex positive lens L23.

The third lens group G3 has, in order from the object, a biconvex positive lens L31, and a cemented lens of a biconvex positive lens L32 and a biconcave negative lens L33.

The fourth lens group G4 has, a cemented lens of a biconvex positive lens L41 and a negative meniscus lens L42 having a convex surface facing the image, in order from the object.

The fifth lens group G5 has a cemented lens of a biconvex positive lens L51 and a biconcave negative lens L52, in order from the object.

An aperture stop S, for adjusting quality of light, is disposed between the second lens group G2 and the third lens group G3.

A low pass filter LPF, for cutting spacial frequency that exceeds a critical resolution of the solid image sensing element, is disposed between the fifth lens group G5 and the imaging plane I. The imaging plane I is formed on the image sensing element, which is not illustrated, and the image sensing element is comprised of a CCD and CMOS.

In the zoom lens of this example having the above configuration, the first lens group G1, the aperture stop S and the third lens group G3 are always fixed with respect to the imaging plane I, and the second lens group G2, the fourth lens group G4 and the fifth lens group G5 are moved upon zooming from the wide angle end state to the telephoto end state.

Table 3 shows a table of each parameter in Example 3. The surface numbers 1 to 27 in Table 3 correspond to the surfaces 1 to 27 in FIG. 5. In Example 3, the fifth surface, sixth surface, eighth surface, fourteenth surface and eighteenth surface all have aspherical shapes.

TABLE 3

[lens data]

| m | r | d | nd | νd |
|---|---|---|---|---|
| object surface | ∞ | | | |
| 1 | 27.2773 | 0.7000 | 1.922860 | 20.88 |
| 2 | 8.9548 | 2.6800 | | |
| 3 | 0.0000 | 8.4000 | 1.846660 | 23.78 |
| 4 | 0.0000 | 0.2000 | | |
| *5 | 13.6668 | 2.5500 | 1.693500 | 53.22 |
| *6 | −17.2270 | d6 | | |
| 7 | −32.5000 | 0.7000 | 1.755121 | 45.60 |
| *8 | 6.2845 | 0.9700 | | |
| 9 | −17.7842 | 0.4000 | 1.882997 | 40.76 |
| 10 | 7.5992 | 1.8000 | 1.922860 | 20.88 |
| 11 | −52.9614 | d11 | | |
| 12 | 0.0000 | 0.3000 | (aperture stop S) | |
| 13 | 8.7381 | 1.3000 | 1.693500 | 53.22 |
| *14 | −29.8645 | 0.1000 | | |
| 15 | 7.2172 | 1.5500 | 1.518229 | 58.93 |
| 16 | −12.4753 | 0.4000 | 1.882997 | 40.76 |
| 17 | 7.9213 | d17 | | |
| *18 | 14.2955 | 3.4500 | 1.693500 | 53.22 |
| 19 | −5.5249 | 0.6500 | 1.903658 | 31.31 |
| 20 | −10.9042 | d20 | | |
| 21 | 17.7272 | 2.6000 | 1.603001 | 65.44 |
| 22 | −7.1407 | 0.4000 | 1.834000 | 37.16 |
| 23 | 16.1148 | d23 | | |
| 24 | ∞ | 0.2100 | 1.516330 | 64.14 |
| 25 | ∞ | 1.0000 | | |
| 26 | ∞ | 0.5000 | 1.516330 | 64.14 |
| 27 | ∞ | Bf | | |
| imaging plane | ∞ | | | |

[aspherical data]

fifth surface

κ = +1.0000, A4 = −7.84780E−05, A6 = −3.97070E−07,
A8 = +2.61250E−09, A10 = 0.00000E+00
sixth surface κ = +1.0000, A4 = +2.84240E−05, A6 = −1.67470E−07,
A8 = +2.80030E−09, A10 = 0.00000E+00
eighth surface κ = +1.0000, A4 = −4.72180E−04, A6 = −1.41680E−06,
A8 = −1.83450E−07, A10 = 0.00000E+00

TABLE 3-continued fourteenth surface

κ = +1.0000, A4 = +7.16020E−05, A6 = −2.50890E−07,
A8 = 0.00000E+00, A10 = 0.00000E+00
eighteenth surface κ = +4.2637, A4 = −2.72250E−04, A6 = +1.58960E−06,
A8 = 0.00000E+00, A10 = 0.00000E+00

[all parameters]
zoom ratio 4.70428

|  | wide angle end | intermediate focal length | telephoto end |
| --- | --- | --- | --- |
| f | 5.15199~ | 10.14959~ | 24.23640 |
| FNO | 4.11749~ | 4.50702~ | 6.03932 |
| ω | 40.18289~ | 21.65903~ | 9.39449 |
| Y | 4.05000~ | 4.05000~ | 4.05000 |
| TL | 56.97949~ | 56.97891~ | 56.97704 |
| Bf | 0.59964~ | 0.59892~ | 0.59703 |

[zooming data]

| variable distance | wide angle end | intermediate focal length | telephoto end |
| --- | --- | --- | --- |
| d6 | 0.50000 | 5.23786 | 8.98004 |
| d11 | 9.08002 | 4.34217 | 0.59999 |
| d17 | 8.82371 | 5.68099 | 1.00000 |
| d20 | 1.00000 | 2.18397 | 2.55813 |
| d23 | 6.11626 | 8.07499 | 12.38184 |

[zoom lens group data]

| group No. | first surface of group | focal length of group |
| --- | --- | --- |
| G1 | 1 | 14.83868 |
| G2 | 7 | −5.83571 |
| G3 | 13 | 15.44915 |
| G4 | 18 | 11.29784 |
| G5 | 21 | −22.02234 |

[Conditional expressions]

Conditional Expression (1)PL/fW = 1.63044
Conditional Expression (2)PL/fT = 0.34659
Conditional Expression (3)fG3/fG4 = 1.3674
Conditional Expression (4)PL/PWL = 0.15672

As the table of parameters in Table 3 shows, the zoom lens according to this example satisfies all the above conditional Expression (1) to (4).

Figure 6A:
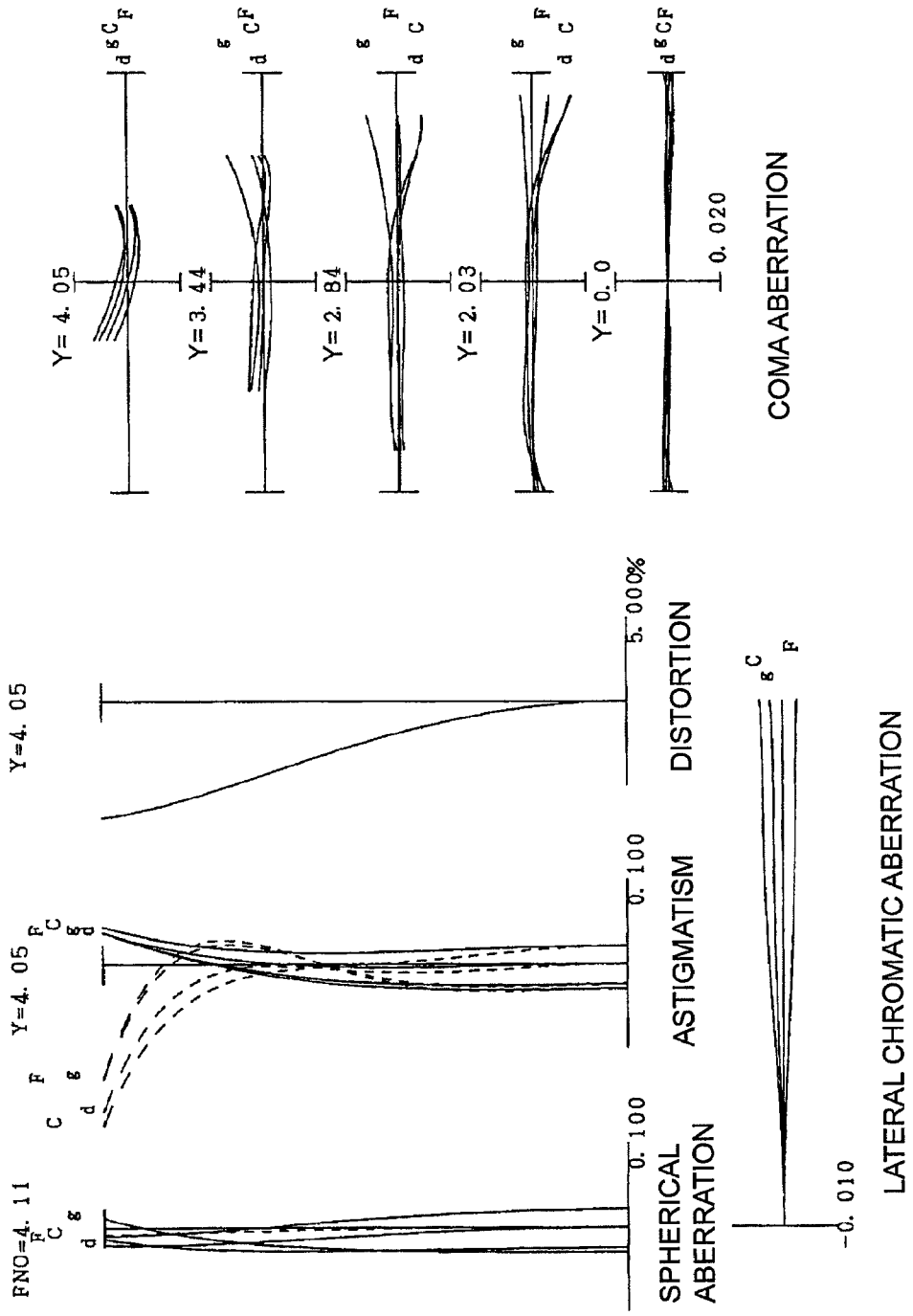
FIG. 6A to FIG. 6C are graphs showing various aberrations of the zoom lens according to Example 3, where FIG. 6A are graphs showing various aberrations upon focusing on infinity in the wide angle end state, FIG. 6B are graphs showing various aberrations upon focusing on infinity in the intermediate focal length state, and FIG. 6C are graphs showing various aberrations upon focusing on infinity in the telephoto end state.
Figure 6B:
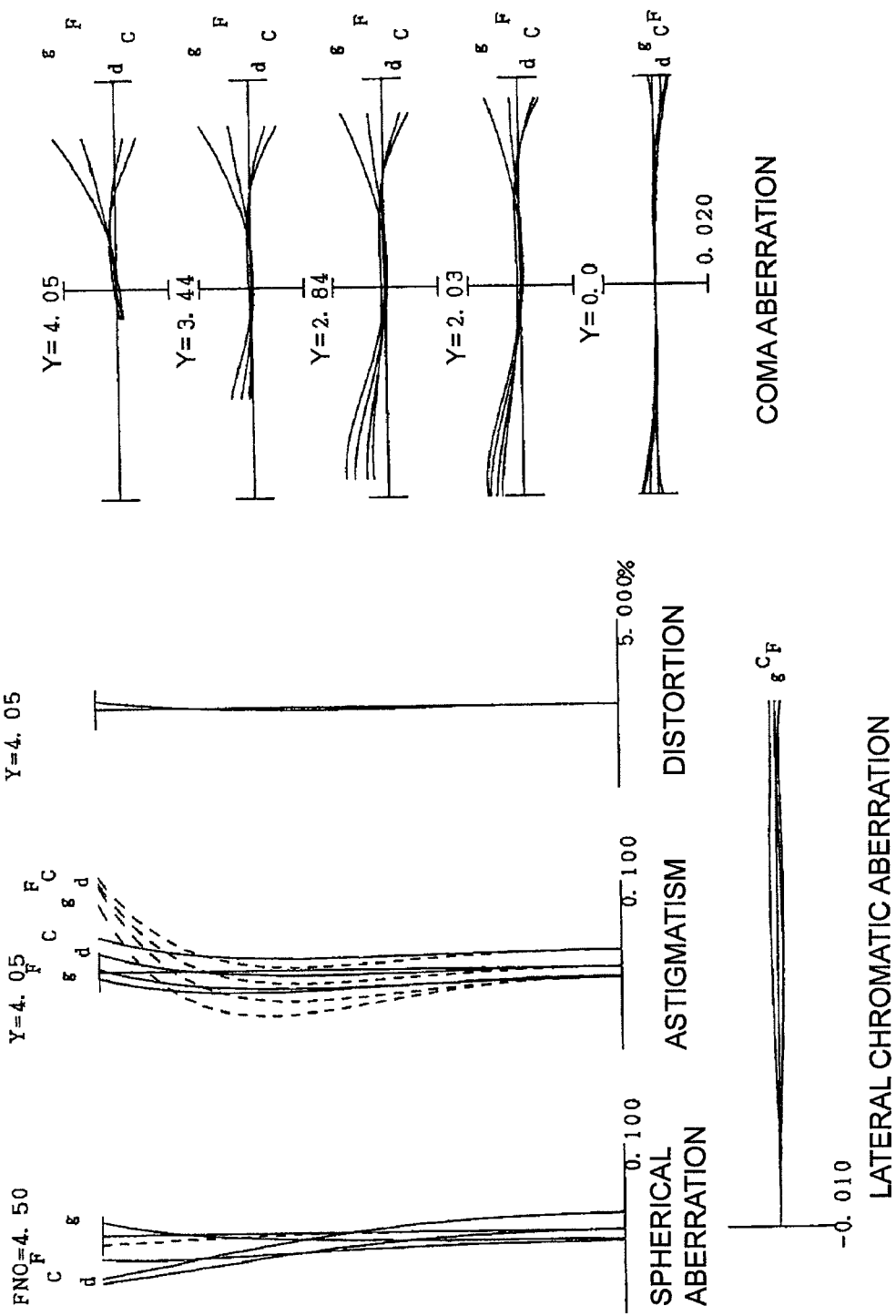
Figure 6C:
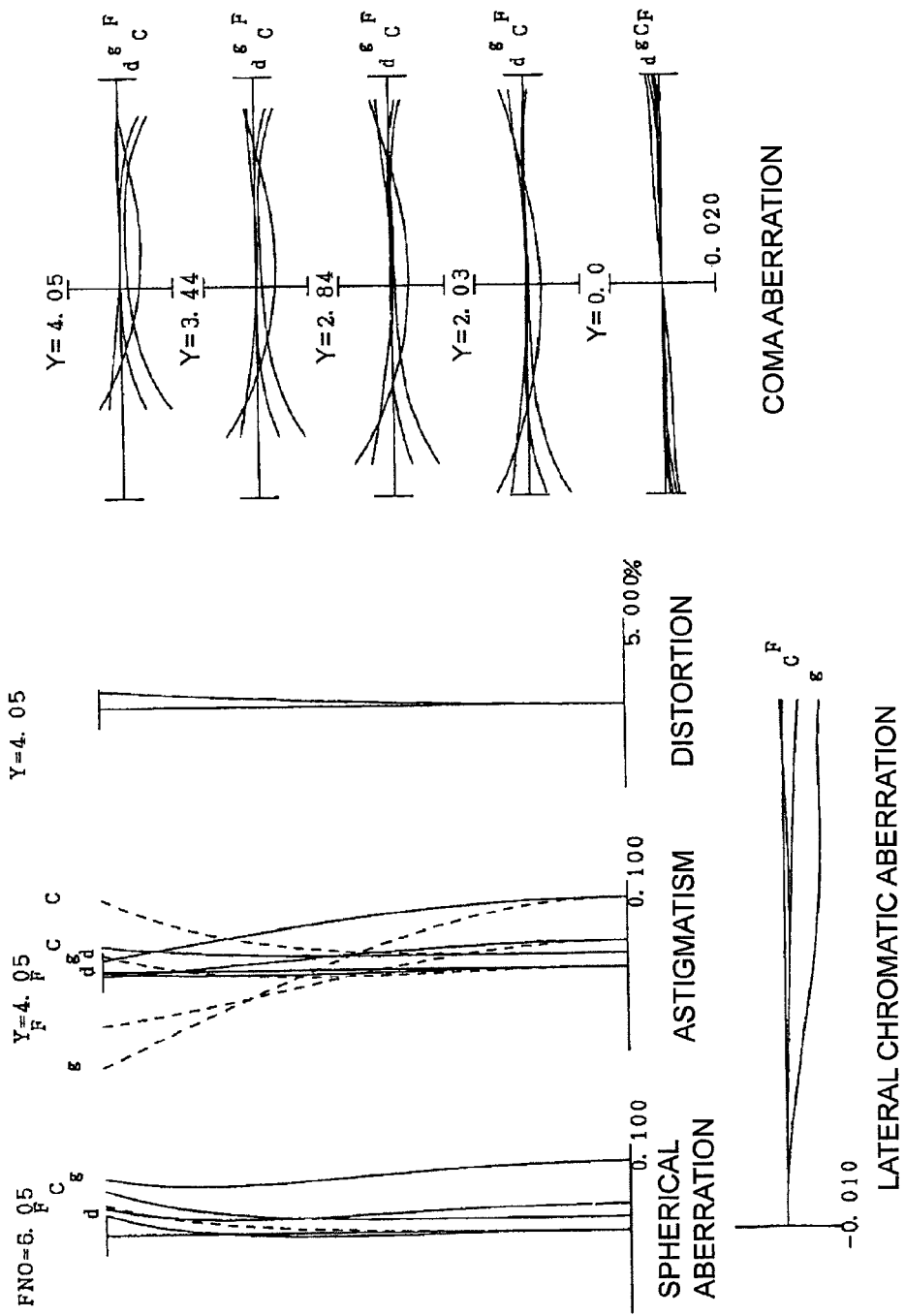

FIG. 6 shows graphs of various aberrations according to Example 3, where FIG. 6A are graphs showing various aberrations upon focusing on infinity in the wide angle end state, FIG. 6B are graphs showing various aberrations upon focusing on infinity in the intermediate focal length state, and FIG. 6C are graphs showing various aberrations upon focusing on infinity in the telephoto end state. As seen in the graphs showing each aberration, according to Example 3, various aberrations in each focal length state from the wide angle end state to the telephoto end state can be appropriately corrected, and an excellent imaging performance can be implemented.

Example 4

Example 4 will now be described with reference to FIG. 7, FIG. 8 and Table 4. FIG. 7 shows a configuration of the zoom lens according to Example 4, and also shows the change of the focal length state, from the wide angle end state (W) (via the intermediate focal length state) to the telephoto end state (T), that is, the state of movement of each lens group upon zooming. In the zoom lens according to Example 4, the optical path is polarized by 90° using a rectangular prism P (optical element for deflecting the optical path) as shown in FIG. 10, but FIG. 7 shows the developed view thereof.

The zoom lens according to Example 4 has, in order from an object, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 has, in order from the object, a negative meniscus lens L11 having a convex surface facing the object, a rectangular prism P for deflecting the optical path 90°, and a biconvex positive lens L12.

The second lens group G2 has, in order from the object, a biconcave negative lens L21, and a cemented lens of a biconcave negative lens L22 and a biconvex positive lens L23.

The third lens group G3 has, in order from the object, a biconvex positive lens L31, and a cemented lens of a biconvex positive lens L32 and a biconcave negative lens L33.

The fourth lens group G4 has, a cemented lens of a biconvex positive lens L41 and a negative meniscus lens L42 having a convex surface facing the image, in order from the object.

The fifth lens group G5 has a cemented lens of a biconvex positive lens L51 and a biconcave negative lens L52, in order from the object.

An aperture stop S, for adjusting quality of light, is disposed between the second lens group G2 and the third lens group G3.

A low pass filter LPF, for cutting spacial frequency that exceeds a critical resolution of the solid image sensing element, is disposed between the fifth lens group G5 and the imaging plane I. The imaging plane I is formed on the image sensing element, which is not illustrated, and the image sensing element is comprised of a CCD and CMOS.

In the zoom lens of this example having the above configuration, the first lens group G1, the aperture stop S and the third lens group G3 are always fixed with respect to the imaging plane I, and the second lens group G2, the fourth lens group G4 and the fifth lens group G5 are moved upon zooming from the wide angle end state to the telephoto end state.

Table 4 shows a table of each parameter in Example 4. The surface numbers 1 to 27 in Table 4 correspond to the surfaces 1 to 27 in FIG. 7. In Example 4, the fifth surface, sixth surface, eighth surface, fourteenth surface and eighteenth surface all have aspherical shapes.

TABLE 4

[lens data]

| m | r | d | nd | νd |
| --- | --- | --- | --- | --- |
| object surface | ∞ | | | |
| 1 | 24.4338 | 0.7000 | 1.922860 | 20.88 |
| 2 | 8.5340 | 2.7674 | | |
| 3 | ∞ | 8.4000 | 1.846660 | 23.78 |
| 4 | ∞ | 0.2000 | | |
| *5 | 13.9639 | 2.5500 | 1.693500 | 53.31 |
| *6 | −17.0828 | d6 | | |
| 7 | −32.5000 | 0.7000 | 1.765460 | 46.73 |
| *8 | 6.4884 | 0.9134 | | |
| 9 | −25.5105 | 0.4000 | 1.882997 | 40.76 |
| 10 | 6.8170 | 1.8000 | 1.922860 | 20.88 |
| 11 | −271.6795 | d11 | | |
| 12 | 0.0000 | 0.3000 | (aperture stop S) | |
| 13 | 9.8840 | 1.3000 | 1.606060 | 57.45 |
| *14 | −22.2846 | 0.1000 | | |
| 15 | 7.1506 | 1.5500 | 1.518229 | 58.93 |
| 16 | −15.3314 | 0.4000 | 1.882997 | 40.76 |

TABLE 4-continued

| | | | | |
|---|---|---|---|---|
| 17 | 9.1229 | d17 | | |
| *18 | 14.4540 | 3.4500 | 1.693500 | 53.22 |
| 19 | −5.9015 | 0.6000 | 1.903658 | 31.31 |
| 20 | −11.3005 | d20 | | |
| 21 | 13.5798 | 2.6000 | 1.603001 | 65.44 |
| 22 | −7.4747 | 0.4000 | 1.834000 | 37.16 |
| 23 | 11.3288 | d23 | | |
| 24 | ∞ | 0.2100 | 1.516330 | 64.14 |
| 25 | ∞ | 1.0000 | | |
| 26 | ∞ | 0.5000 | 1.516330 | 64.14 |
| 27 | ∞ | Bf | | |
| imaging plane | ∞ | | | |

[aspherical data]

fifth surface

κ = +1.0000, A4 = −8.58680E−05, A6 = −3.05900E−07,
A8 = −2.07220E−09, A10 = 0.00000E+00 sixth surface

κ = +1.0000, A4 = +8.02510E−06, A6 = +7.31250E−09,
A8 = −2.26130E−09, A10 = 0.00000E+00 eighth surface

κ = +1.0000, A4 = −4.17550E−04, A6 = −1.70980E−06,
A8 = +2.28340E−08, A10 = 0.00000E+00 fourteenth surface

κ = +1.0000, A4 = +8.48630E−05, A6 = 0.00000E+00,
A8 = 0.00000E+00, A10 = 0.00000E+00 eighteenth surface

κ = +0.8950, A4 = −1.40330E−04, A6 = +2.28600E−06,
A8 = 0.00000E+00, A10 = 0.00000E+00

[all parameters]
zoom ratio 4.70434

| | wide angle end | intermediate focal length | telephoto end |
|---|---|---|---|
| f | 5.15199~ | 10.14959~ | 24.23671 |
| FNO | 4.10656~ | 4.47665~ | 6.11490 |
| ω | 40.12682~ | 20.00748~ | 11.72370 |
| Y | 4.05000~ | 4.05000~ | 4.05000 |
| TL | 57.06692~ | 57.06649~ | 56.06486 |
| Bf | 0.59951~ | 0.59908~ | 0.59747 |

[zooming data]

| variable distance | wide angle end | intermediate focal length | telephoto end |
|---|---|---|---|
| d6 | 0.50000 | 5.31289 | 9.03655 |
| d11 | 9.13656 | 4.32368 | 0.60000 |
| d17 | 8.87526 | 5.78781 | 1.00000 |
| d20 | 1.00000 | 2.33169 | 2.92853 |
| d23 | 6.11479 | 7.87054 | 12.06151 |

[zoom lens group data]

| group No. | first surface of group | focal length of group |
|---|---|---|
| G1 | 1 | 15.03501 |
| G2 | 7 | −5.86083 |
| G3 | 13 | 15.67234 |
| G4 | 18 | 11.41548 |
| G5 | 21 | −19.10688 |

[Conditional expressions]

Conditional Expression (1)PL/fW = 1.63044
Conditional Expression (2)PL/fT = 0.34658
Conditional Expression (3)fG3/fG4 = 1.3674
Conditional Expression (4)PL/PWL = 0.15672

As the table of parameters in Table 4 shows, the zoom lens according to this example satisfies all the above conditional Expression (1) to (4).

Figure 8A:
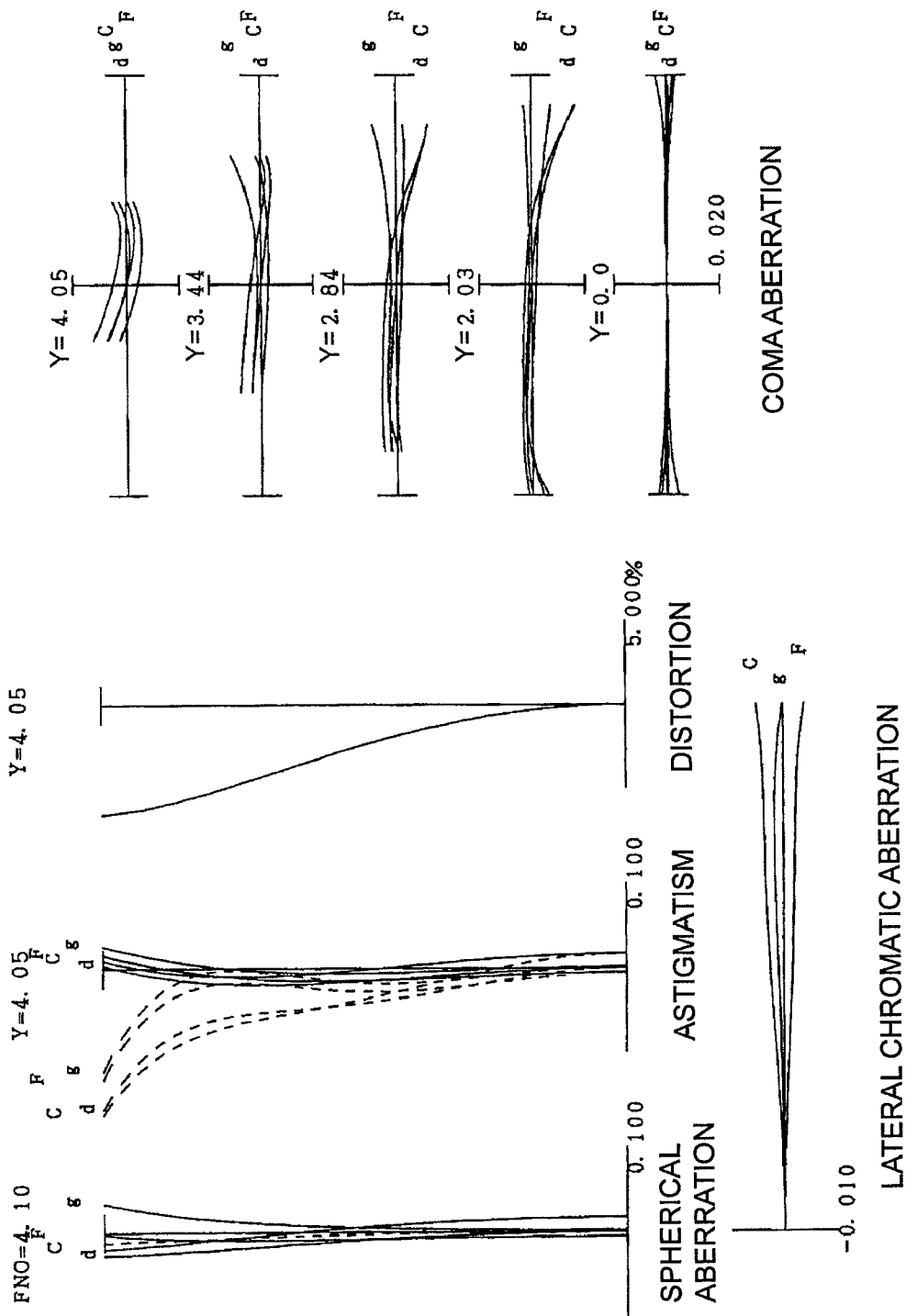
FIG. 8A to FIG. 8C are graphs showing various aberrations of the zoom lens according to Example 4, where FIG. 8A are graphs showing various aberrations upon focusing on infinity in the wide angle end state, FIG. 8B are graphs showing various aberrations upon focusing on infinity in the intermediate focal length state, and FIG. 8C are graphs showing various aberrations upon focusing on infinity in the telephoto end state.
Figure 8B:
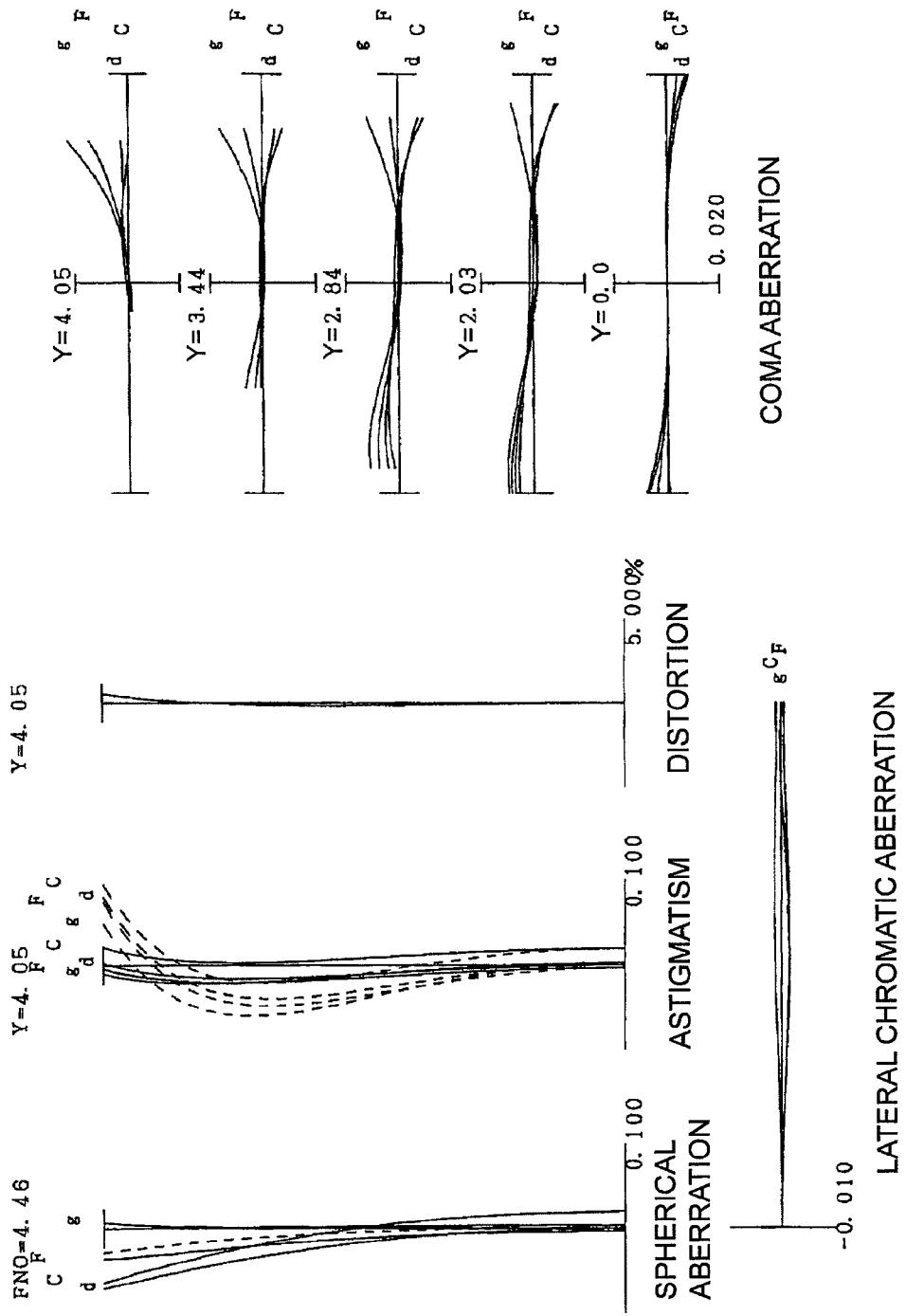
Figure 8C:
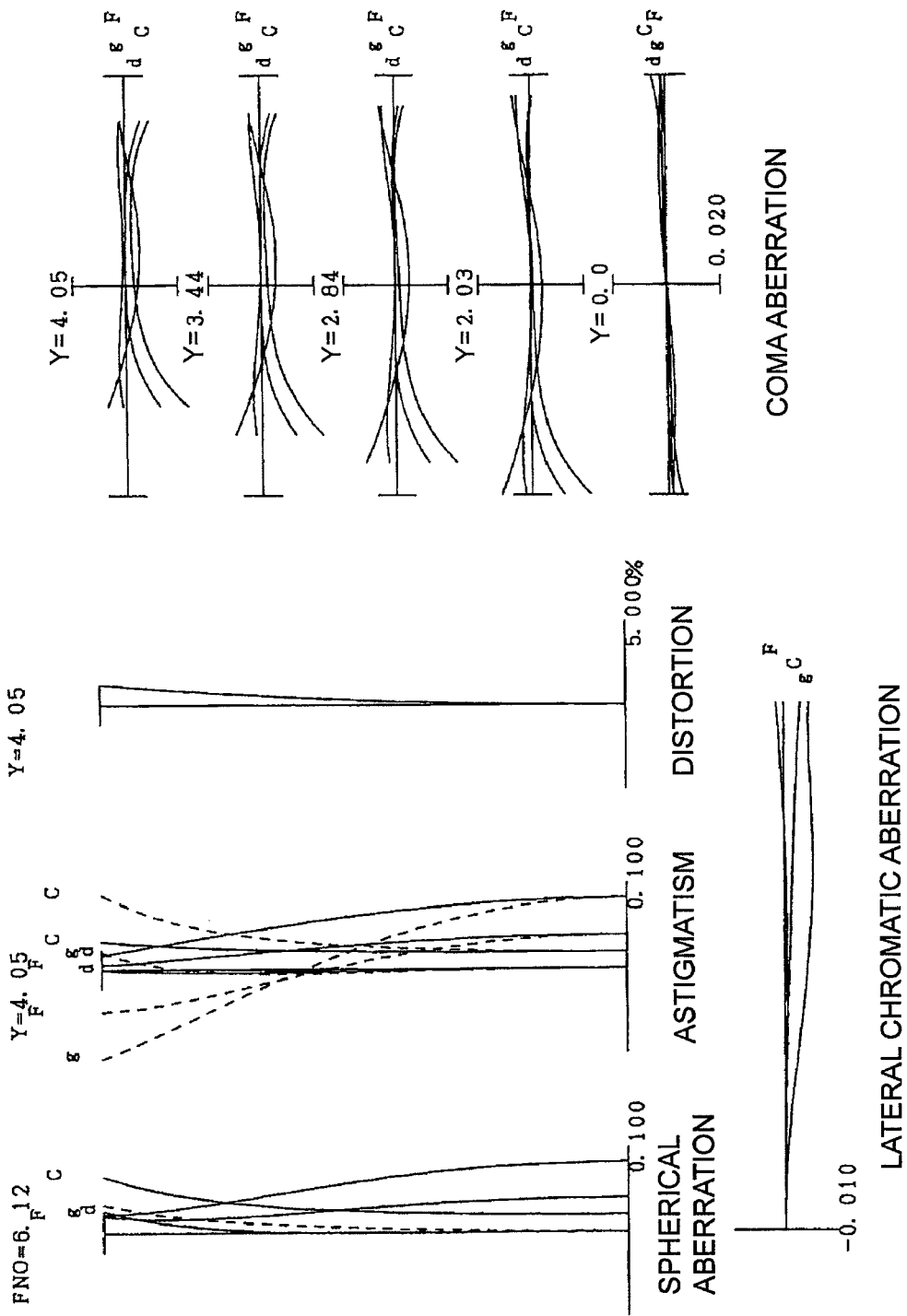

FIG. 8 shows graphs of various aberrations according to Example 4, where FIG. 8A are graphs showing various aberrations upon focusing on infinity in the wide angle end state, FIG. 8B are graphs showing various aberrations upon focusing on infinity in the intermediate focal length state, and FIG. 8C are graphs showing various aberrations upon focusing on infinity in the telephoto end state. As seen in the graphs showing each aberration, according to Example 4, various aberrations in each focal length state from the wide angle end state to the telephoto end state can be appropriately corrected, and an excellent imaging performance can be implemented.

In the above embodiment, the following content may be used when appropriate, within a range that does not diminish optical performance.

In each example, a zoom lens having a five-group configuration was shown, but the present invention can also be applied to other group configurations, such as a six-group and seven-group configuration. The present invention can also be applied to a configuration in which a lens or a lens group is added at the side closest to the object, or a configuration in which a lens or a lens group is added at the side closest to the image. A lens group refers to a portion having at least one lens, separated by an air space which changes upon zooming.

In the present embodiment, a focusing lens group, which focuses from an infinite distance object to a short distance object, by moving a single or plurality of lens group (s) or a partial lens group in the optical axis direction, may be used. This focusing lens group can also be applied to auto focus, and is also appropriate for driving a motor for auto focus (using an ultrasonic motor). It is particularly preferable that the fourth lens group G4 or the fifth lens group G5 is the focusing lens group. If the fourth lens group G4 is the focusing lens group, this lens group is moved to the object side along the optical axis. If the fifth lens group G5 is the focusing lens group, this lens group is moved to the image side along the optical axis.

In the present embodiment, a lens group or a partial lens group may be a vibration proof lens group for correcting an image blur generated by hand motion, by vibrating the lens group or the partial lens group in a direction perpendicular to the optical axis, or by rotating (oscillating) in the in-plane direction including the optical axis. It is particularly preferable that all or a part of the third lens group G3 is the vibration proof lens group.

In the present embodiment, the lens surface may be a spherical surface, plane surface or aspherical surface. If the lens surface is spherical or plane, the lens processing, assembly and adjustment become easy, and deterioration of optical performance due to an error during processing, assembly and adjustment can be prevented, which is preferable. Deterioration of writing performance is also less even if the imaging plane is shafted, which is preferable. If the lens surface is aspherical, the aspherical surface may be an aspherical surface created by grinding, a glass mold aspherical surface created by molding glass into an aspherical shape using a die, or a composite aspherical surface created by forming resin on the surface of glass into an aspherical shape. In the present embodiment, it is preferable that there are three or more aspherical surfaces. The lens surface may be a diffraction surface, and the lens may be a refractive index distribution lens (GRIN lens), or a plastic lens.

In the present embodiment, it is preferable that the aperture stop S is disposed at the object side of the third lens group G3, but the role of the aperture stop may be played by the lens frame, without disposing an aperture stop as a separate element.

In the present embodiment, an anti-reflection film having high transmittance in a wide wavelength range may be disposed on each lens surface, so as to implement optical performance with high contrast, with less flares and ghosts.

In the zoom lens (zooming optical system) of the present embodiment, the focal length is 24 to 30 mm in the wide angle end state converted into a 35 mm system, and the zoom ratio is about 4.5 to 10.

In the zoom lens (zooming optical system) of the present embodiment, it is preferable that the first lens group G1 has at least one positive lens component and one negative lens component. In the first lens group G1, it is preferable that lens components are disposed with an air space there between, in order from an object, as a negative lens, prism, and positive lens, or as a negative lens, negative lens, prism, and positive lens, or as a negative lens, prism, positive lens and positive lens, or as a negative lens, prism and positive cemented lens.

It is preferable that the second lens group G2 of the present embodiment has at least one positive lens and one negative lens. It is preferable that the second lens group G2 has one cemented lens and one single lens, and the single lens may be disposed at the image side of the cemented lens. The cemented lens of the second lens group G2 may be a positive lens and a negative lens, which are cemented in order from the object.

It is preferable that the third lens group G3 of the present embodiment has at least one positive lens and one negative lens. It is preferable that the third lens group G3 has one cemented lens and one single lens, and the single lens may be disposed in the image side of the cemented lens. The cemented lens of the third lens group G3 may be a negative lens and a positive lens, which are cemented in order from the object.

It is preferable that the fourth lens group G4 of the present embodiment has at least one positive lens component and one negative lens component. It is also preferable to dispose one cemented lens of a negative lens and a positive lens, or one cemented lens of a positive lens and a negative lens, in order from the object.

It is preferable that the fifth lens group G5 of the present embodiment has one positive lens component and one negative lens component. It is also preferable to dispose one cemented lens of a negative lens and a positive lens, or one cemented lens of a positive lens and a negative lens, in order from the object.

The present invention was described using the composing requirements of the embodiments, but needless to say, the present invention is not limited to these.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens having an optical element for deflecting an optical path, comprising, in order from an object: a first lens group having positive refractive power; a second lens group having negative refractive power; a third lens group having positive refractive power; a fourth lens group having positive refractive power; and a fifth lens group having negative refractive power, the third lens group having a plurality of lenses, and
the following conditional expressions being satisfied:

$$1.00 < PL/fW < 1.75$$

$$0.30 < PL/fT < 0.45$$

where PL denotes an optical path length of the optical element for deflecting the optical path, fW denotes a focal length of the zoom lens in a wide angle end state, and fT denotes a focal length of the zoom lens in a telephoto end state.

2. The zoom lens according to claim 1, wherein the second lens group, the fourth lens group and the fifth lens group are moved upon zooming from the wide angle end state to the telephoto end state.

3. The zoom lens according to claim 1, wherein an aperture stop is disposed between the second lens group and the third lens group.

4. The zoom lens according to claim 1, wherein the first lens group and the third lens group are fixed in positions on an optical axis upon zooming from the wide angle end state to the telephoto end state.

5. The zoom lens according to claim 1, wherein the following conditional expression is satisfied:

$$1.0 < fG3/fG4 < 2.0$$

where fG3 denotes a focal length of the third lens group and fG4 denotes a focal length of the fourth lens group.

6. The zoom lens according to claim 1, wherein the first lens group has, in order from the object, a lens having negative refractive power, an optical element for deflecting the optical path, and a lens having positive refractive power.

7. The zoom lens according to claim 1, wherein the third lens group has, in order from the object, a lens having positive refractive power, and a cemented lens of a lens having positive refractive power and a lens having negative refractive power.

8. The zoom lens according to claim 1, wherein at least one of the fourth lens group and the fifth lens group is one cemented lens.

9. The zoom lens according to claim 1, wherein at least one of the fourth lens group and the fifth lens group has a cemented lens of a lens having positive refractive power and a lens having negative refractive power.

10. An optical apparatus having the zoom lens according to claim 1.

11. A zoom lens having an optical element for deflecting an optical path, comprising, in order from an object: a first lens group having positive refractive power; a second lens group having negative refractive power; a third lens group having positive refractive power; a fourth lens group having positive refractive power; and a fifth lens group having negative refractive power, the third lens group having a plurality of lenses, and
the following conditional expressions being satisfied:

$$1.5 < PL/fW < 3.0$$

$$0.0 < PL/PWL < 0.17$$

where PL denotes an optical path length of the optical element, fW is a focal length of the zoom lens in a wide angle end state, and PWL is an optical axis length of the optical element from an entrance plane to an imaging plane.

12. The zoom lens according to claim 11, wherein the third lens group has, in order from the object, a lens having positive refractive power, and a cemented lens of a lens having positive refractive power and a lens having negative refractive power.

13. The zoom lens according to claim 11, wherein the second lens group, the fourth lens group and the fifth lens group are moved upon zooming from the wide angle end state to the telephoto end state.

14. The zoom lens according to claim 11, wherein an aperture stop is disposed between the second lens group and the third lens group.

15. The zoom lens according to claim 11, wherein the first lens group and the third lens group are fixed in positions on an optical axis upon zooming from the wide angle end state to the telephoto end state.

16. The zoom lens according to claim 11, wherein the following conditional expression is satisfied:

$$1.0 < fG3/fG4 < 2.0$$

where $fG3$ denotes a focal length of the third lens group, and $fG4$ denotes a focal length of the fourth lens group.

17. The zoom lens according to claim 11, wherein the first lens group has, in order from the object, a lens having negative refractive power, an optical element for deflecting the optical path, and a lens having positive refractive power.

18. The zoom lens according to claim 11, wherein at least one of the fourth lens group and the fifth lens group is one cemented lens.

19. The zoom lens according to claim 11, wherein at least one of the fourth lens group and the fifth lens group has a cemented lens of a lens having positive refractive power and a lens having negative refractive power.

20. An optical apparatus having the zoom lens according to claim 11.

21. A manufacturing method for a zoom lens having an optical element for deflecting an optical path, the method comprising the step of: disposing, in order from an object, a first lens group having positive refractive power, a second lens group having negative refractive power, a third lens group having positive refractive power, a fourth lens group having positive refractive power, and a fifth lens group having negative refractive power,
the third lens group having a plurality of lenses, and
the following conditional expressions being satisfied:

$$1.00 < PL/fW < 1.75$$

$$0.30 < PL/fT < 0.45$$

where PL denotes an optical path length of the optical element for deflecting the optical path, fW denotes a focal length of the zoom lens in a wide angle end state, and fT denotes a focal length of the zoom lens in a telephoto end state.

22. The manufacturing method for a zoom lens according to claim 21, wherein the second lens group, the fourth lens group and the fifth lens group are moved upon zooming from the wide angle end state to the telephoto end state.

23. The manufacturing method for a zoom lens according to claim 21, wherein the following conditional expression is satisfied:

$$1.0 < fG3/fG4 < 2.0$$

where $fG3$ denotes a focal length of the third lens group and $fG4$ denotes a focal length of the fourth lens group.

24. A manufacturing method for a zoom lens having an optical element for deflecting an optical path, the method comprising the step of:
disposing, in order from an object, a first lens group having positive refractive power, a second lens group having negative refractive power, a third lens group having positive refractive power, a fourth lens group having positive refractive power, and a fifth lens group having negative refractive power,
the third lens group having, in order from the object, a lens having positive refractive power, and a cemented lens of a lens having positive refractive power and a lens having negative refractive power, and
the following conditional expressions being satisfied:

$$1.5 < PL/fW < 3.0$$

$$0.0 < PL/PWL < 0.17$$

where PL denotes an optical path length of the optical element, fW is a focal length of the zoom lens in a wide angle end state, and PWL is an optical axis length of the optical element from an entrance plane to an imaging plane.

25. The manufacturing method for a zoom lens according to claim 24, wherein the first lens group and the third lens group are fixed in positions on an optical axis upon zooming from the wide angle end state to the telephoto end state.

26. The manufacturing method for a zoom lens according to claim 24, wherein the following conditional expression is satisfied:

$$1.0 < fG3/fG4 < 2.0$$

where $fG3$ denotes a focal length of the third lens group and $fG4$ denotes a focal length of the fourth lens group.

* * * * *